United States Patent
Ganguly et al.

(10) Patent No.: US 11,158,335 B1
(45) Date of Patent: Oct. 26, 2021

(54) AUDIO BEAM SELECTION

(71) Applicant: Amazon Technologies, Inc., Seattle, WA (US)

(72) Inventors: Anshuman Ganguly, Cambridge, MA (US); Srivatsan Kandadai, San Jose, CA (US); Wontak Kim, Watertown, MA (US)

(73) Assignee: Amazon Technologies, Inc., Seattle, WA (US)

( * ) Notice: Subject to any disclaimer, the term of this patent is extended or adjusted under 35 U.S.C. 154(b) by 3 days.

(21) Appl. No.: 16/368,107

(22) Filed: Mar. 28, 2019

(51) Int. Cl.
| *G10L 25/84* | (2013.01) |
| *H04R 3/00* | (2006.01) |
| *H04R 1/40* | (2006.01) |
| *G10L 15/22* | (2006.01) |

(52) U.S. Cl.
CPC .............. *G10L 25/84* (2013.01); *G10L 15/22* (2013.01); *H04R 1/406* (2013.01); *H04R 3/005* (2013.01)

(58) Field of Classification Search
CPC .......................... G10L 25/00–2025/937; G10L 21/02–21/0264; G10L 15/22; H04R 1/406; H04R 3/005
See application file for complete search history.

(56) References Cited

U.S. PATENT DOCUMENTS

| 10,764,676 | B1 * | 9/2020 | Luo ...................... H04R 25/407 |
| 10,811,029 | B1 * | 10/2020 | Mansour ................ G10L 25/21 |
| 2007/0053524 | A1 * | 3/2007 | Haulick ................ H04R 3/005 |
| | | | 381/92 |
| 2009/0304203 | A1 * | 12/2009 | Haykin .................. G10L 21/02 |
| | | | 381/94.1 |
| 2017/0315237 | A1 * | 11/2017 | Steenstrup .......... G01S 15/8902 |
| 2020/0221230 | A1 * | 7/2020 | Fuchs ................... G10L 19/173 |
| 2020/0251108 | A1 * | 8/2020 | Suzuki ............... G06K 9/00845 |
| 2020/0265859 | A1 * | 8/2020 | LaBosco ............... H04L 65/403 |

* cited by examiner

*Primary Examiner* — Abul K Azad
(74) *Attorney, Agent, or Firm* — Pierce Atwood LLP

(57) ABSTRACT

A voice-controlled device includes a beamformer for determining audio data corresponding to one or more directions and a beam selector for selecting in which direction a source of target audio lies. The device determines magnitude spectrums for each beam and for each frequency bin in each beam for each frame of audio data. The device determines frame-by-frame changes in the magnitude and filters the changes to smooth them. The device selects the beam having the greatest smoothed change in magnitude as corresponding to speech.

20 Claims, 15 Drawing Sheets

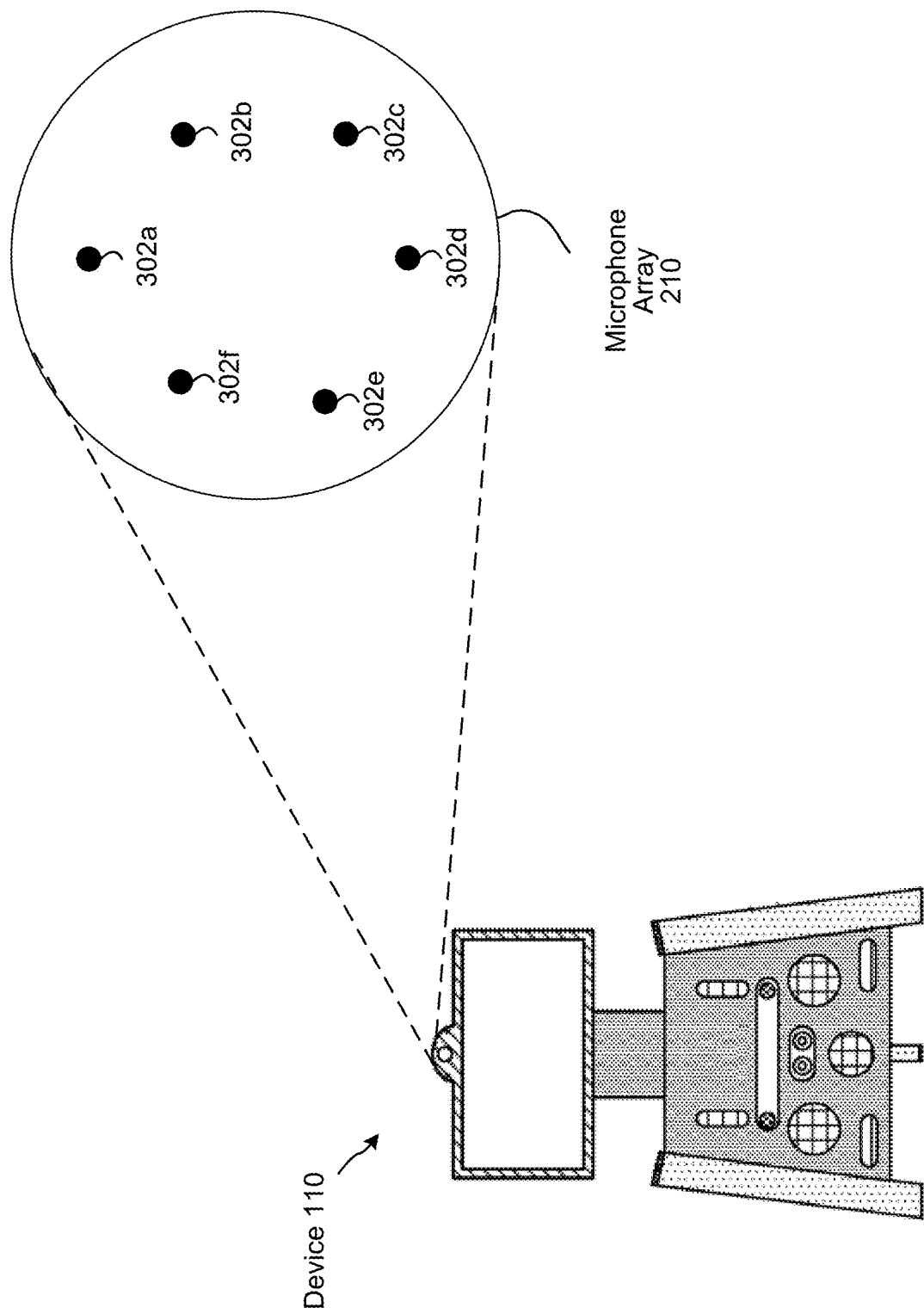

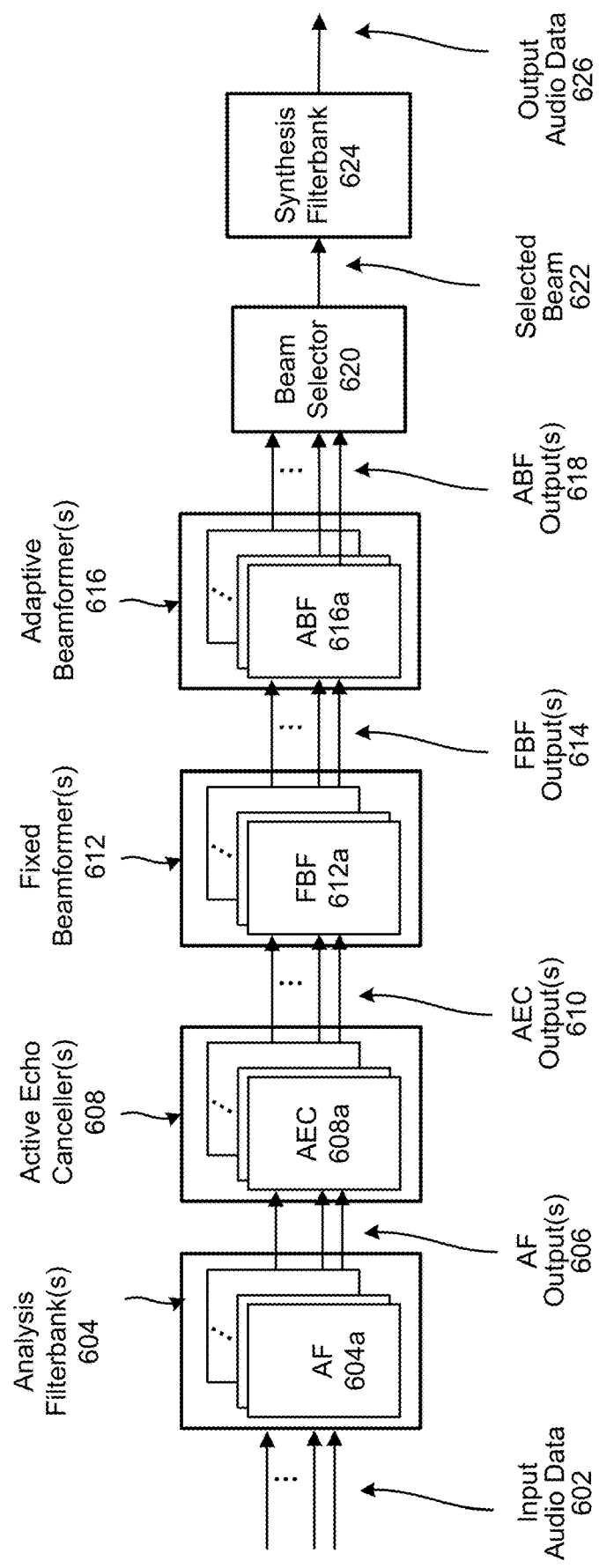

FIG. 8A

Audio Magnitude – Previous Frame

| Beam Number | 1 | 2 | 3 | 4 | 5 | 6 |
|---|---|---|---|---|---|---|
| 1 | 1.0 | 0.8 | 0.2 | 0.2 | 0.2 | 0.2 |
| 2 | 1.1 | 0.7 | 0.2 | 0.2 | 0.2 | 0.2 |
| 3 | 0.9 | 1.1 | 0.2 | 0.2 | 0.2 | 0.2 |
| 4 | 0.8 | 1.0 | 0.2 | 0.2 | 0.2 | 0.2 |

Frequency Bin Number

FIG. 8B

Audio Magnitude – Current Frame

| Beam Number | 1 | 2 | 3 | 4 | 5 | 6 |
|---|---|---|---|---|---|---|
| 1 | 0.9 | 0.9 | 0.2 | 0.2 | 0.2 | 0.2 |
| 2 | 2.1 | 1.7 | 0.2 | 0.2 | 0.2 | 0.2 |
| 3 | 0.8 | 1.0 | 0.2 | 0.2 | 0.2 | 0.2 |
| 4 | 0.9 | 1.2 | 0.2 | 0.2 | 0.2 | 0.2 |

Frequency Bin Number

FIG. 8C

Change in Audio Magnitude – Current Frame vs. Previous Frame

| Beam Number | 1 | 2 | 3 | 4 | 5 | 6 |
|---|---|---|---|---|---|---|
| 1 | 0.1 | 0.1 | 0.0 | 0.0 | 0.0 | 0.0 |
| 2 | 1.0 | 1.0 | 0.0 | 0.0 | 0.0 | 0.0 |
| 3 | 0.1 | 0.1 | 0.0 | 0.0 | 0.0 | 0.0 |
| 4 | 0.1 | 0.2 | 0.0 | 0.0 | 0.0 | 0.0 |

Frequency Bin Number

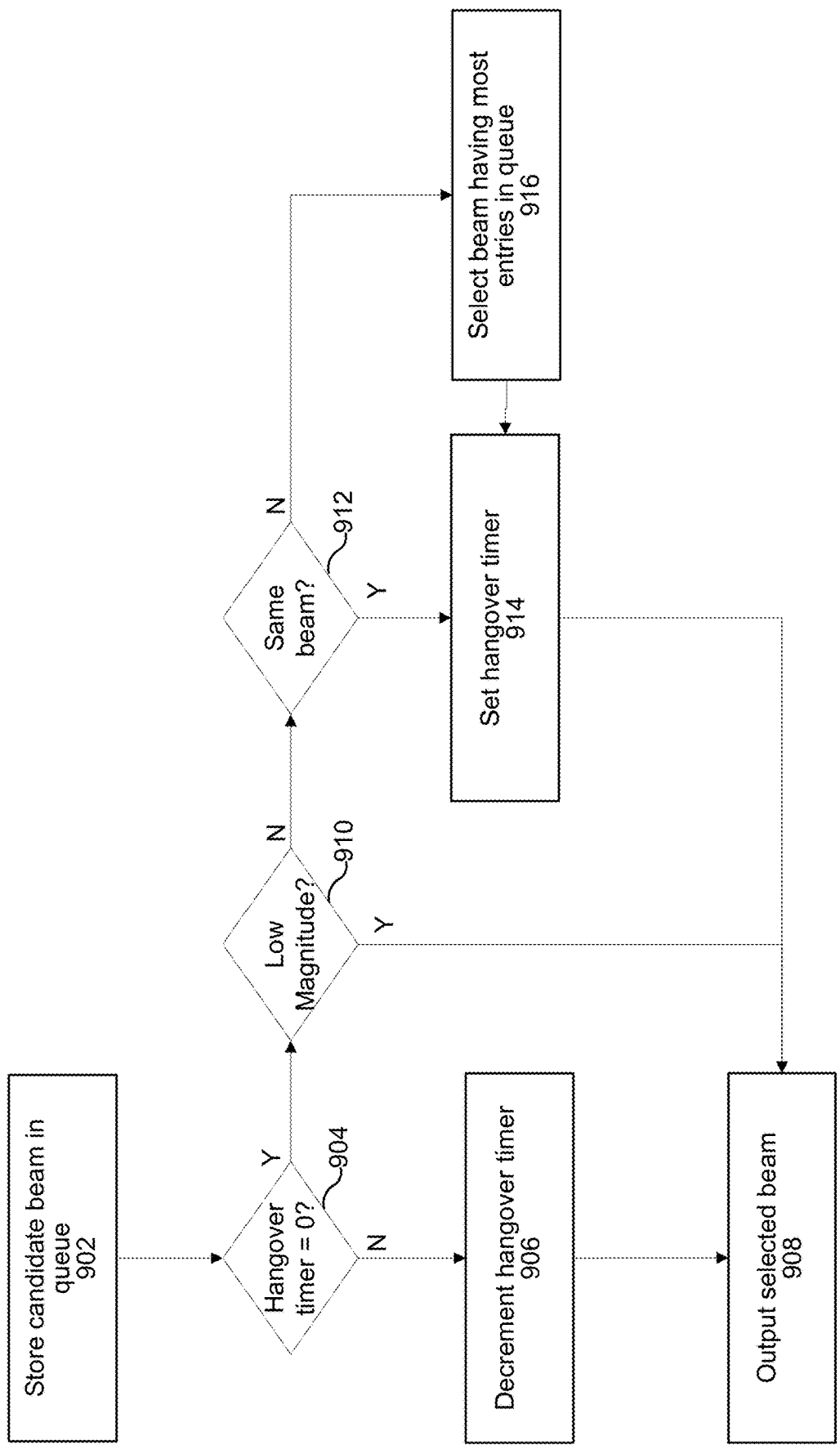

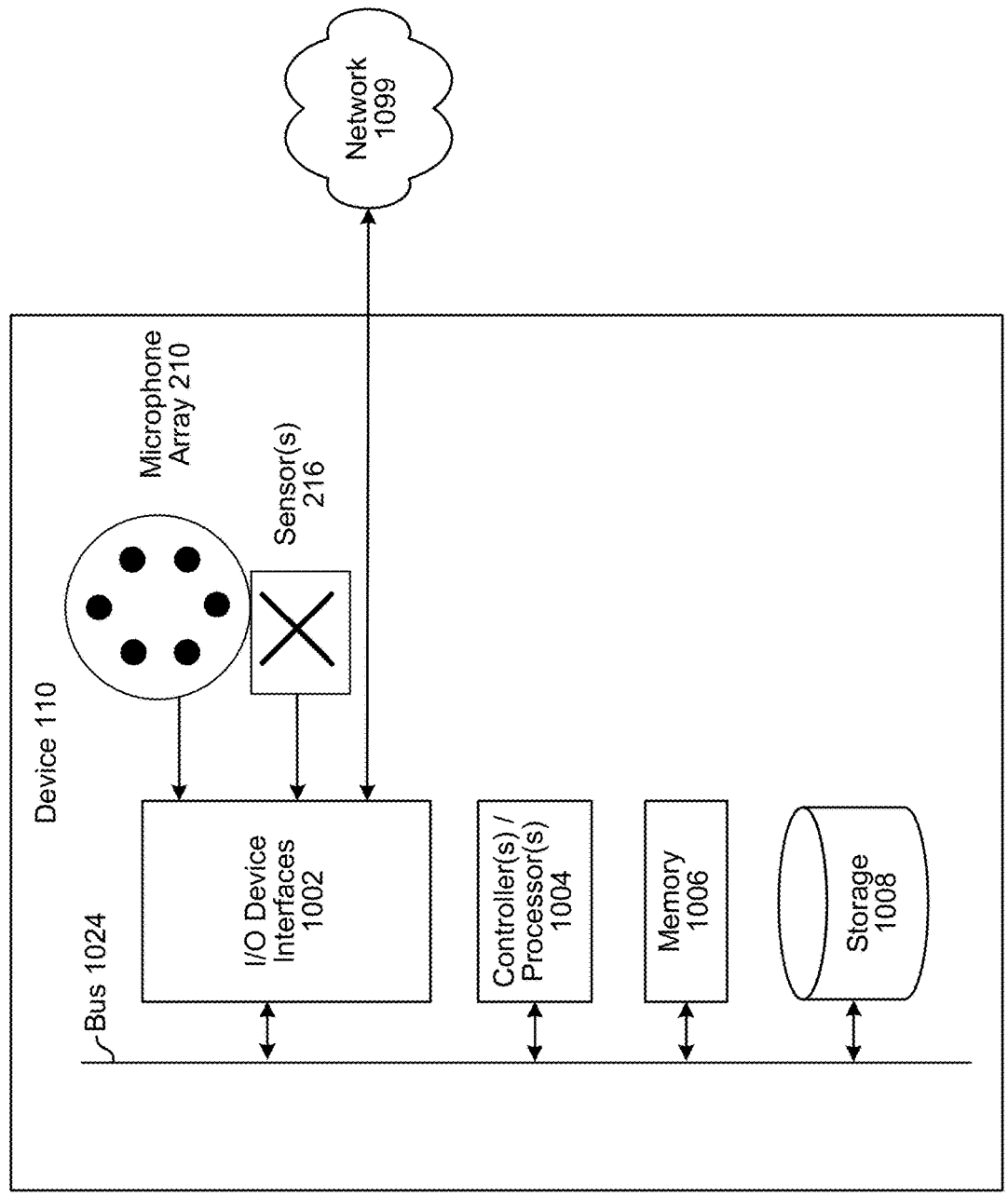

AUDIO BEAM SELECTION

BACKGROUND

In audio systems, beamforming refers to techniques that use a microphone array to isolate audio from particular directions into directional audio data called beams and then select one beam for further processing. Beamforming may further be used to filter out noise from other directions. Beamforming may be used for various tasks, including isolating voice commands to be executed by a speech-processing system.

BRIEF DESCRIPTION OF DRAWINGS

For a more complete understanding of the present disclosure, reference is now made to the following description taken in conjunction with the accompanying drawings.

FIG. 3 illustrates a microphone array according to embodiments of the present disclosure.

FIGS. 6A, 6B, and 6C illustrate systems for beam selection according to embodiments of the present disclosure.

FIGS. 8A, 8B, and 8C illustrate exemplary magnitude spectrums according to embodiments of the present disclosure.

FIG. 9 illustrates operation of a hangover processor according to embodiments of the present disclosure.

FIG. 10 illustrates a device for beamforming according to embodiments of the present disclosure.

DETAILED DESCRIPTION

Speech-recognition systems of computing devices enable humans to interact with the computing devices using speech. Such systems use techniques to identify words spoken by a human user based on various qualities of a received audio input. Speech recognition combined with natural-language understanding processing techniques enable speech-based user control of a computing device to perform tasks based on the user's spoken commands. The combination of speech recognition and natural-language understanding processing techniques may be referred to as speech processing. Speech processing may be used to convert a user's speech into corresponding text data, which may then be provided to various text-based software applications. Speech processing may be used by autonomously mobile devices, computers, hand-held devices, telephone computer systems, smart loudspeakers, kiosks, and a wide variety of other devices to improve human-computer interactions.

Certain devices capable of capturing speech for speech processing may operate using a microphone array comprising multiple microphones, in which beamforming techniques operate on the audio captured by the microphone array. A fixed beamformer component may isolate audio from particular directions by applying one or more filters, each having different filter coefficients, to exploit variations in the time each microphone in the array receives audio from each direction. An adaptive beamformer may remove noise by identifying a direction in which a noise source lies and removing the noise from desired audio. A beam selection component selects at least one beam from a plurality of beams corresponding to a desired direction, such as a direction toward which a speaker is disposed.

Figure 1:
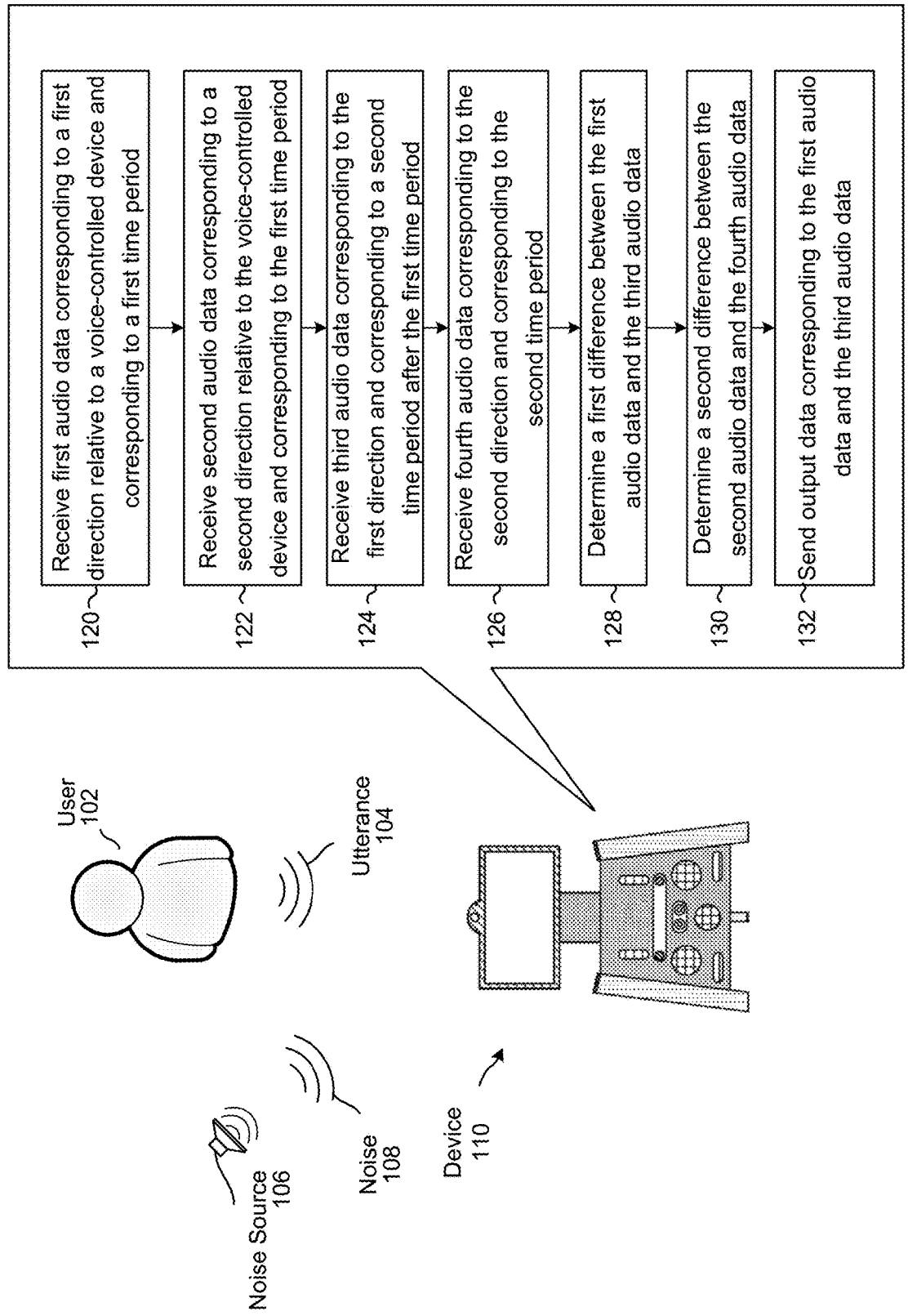
FIG. 1 illustrates a system and method for selecting a beam of a voice-controlled device according to embodiments of the present disclosure.

FIG. 1 illustrates a system that includes a voice-controlled device 110, which is described in greater detail below. In various embodiments, the voice-controlled device 110 is capable of autonomous movement/motion using one or motors powering one or more wheels, treads, robotic limbs, or similar actuators, but the present disclosure is not limited to only devices capable of autonomous movement/motion, and the device 110 may be any voice-controlled device. The device 110 may, for example, follow a user 102 around a room to thereby allow the user 102 easier access to features of the device 110. The device 110 may further include one or more display screens for displaying information to a user 102 and/or receiving touch input from a user. The device 110 may further include a microphone array including one or more microphones and one or more loudspeakers; the microphone array and loudspeakers may be used to receive audio data, such as an utterance 104, from the user 102. The utterance may be, for example, a command or request. The device 110 may also be used to output audio to the user 102, such as audio related to a command or audio related to a request. A nearby noise source 106 may output noise audio 108.

The device 110 may further include one or more sensors; these sensors may include, but are not limited to, an accelerometer, a gyroscope, a magnetic field sensor, an orientation sensor, a weight sensor, a temperature sensor, and/or a location sensor (e.g., a global-positioning system (GPS) sensor or a Wi-Fi round-trip time sensor). The device 110 may further include a computer memory, a computer processor, and one or more network interfaces. The voice-controlled device 110 may be, in some embodiments, a robotic assistant or "robot" that may move about a room or rooms to provide a user with requested information or services. In other embodiments, the device 110 is capable of rotation but not linear motion; the device 110 may, for example, be mounted or placed on a surface or floor and may rotate in place to face a user 102. In other embodiments, the device 110 may be a smart loudspeaker, smart phone, or other such voice-controlled device. The disclosure is not, however, limited to only these devices or components, and the voice-controlled device 110 may include additional components without departing from the disclosure.

In various embodiments, with reference to FIG. 1, the device 110 receives (120) first audio data corresponding to a first direction relative to a voice-controlled device and corresponding to a first time period. The device 110 receives (122) second audio data corresponding to a second direction relative to the voice-controlled device and corresponding to the first time period. The device 110 receives (124) third audio data corresponding to the first direction and corresponding to a second time period after the first time period. The device 110 receives (126) fourth audio data corresponding to the second direction and corresponding to the second time period. The device 110 determines (128) a first difference between the first audio data and the third audio data. The device 110 determines (130) a second difference between the second audio data and the fourth audio data. The device sends (132) output data corresponding to the first audio data and the third audio data to, for example, a speech-processing system.

Figure 2A:
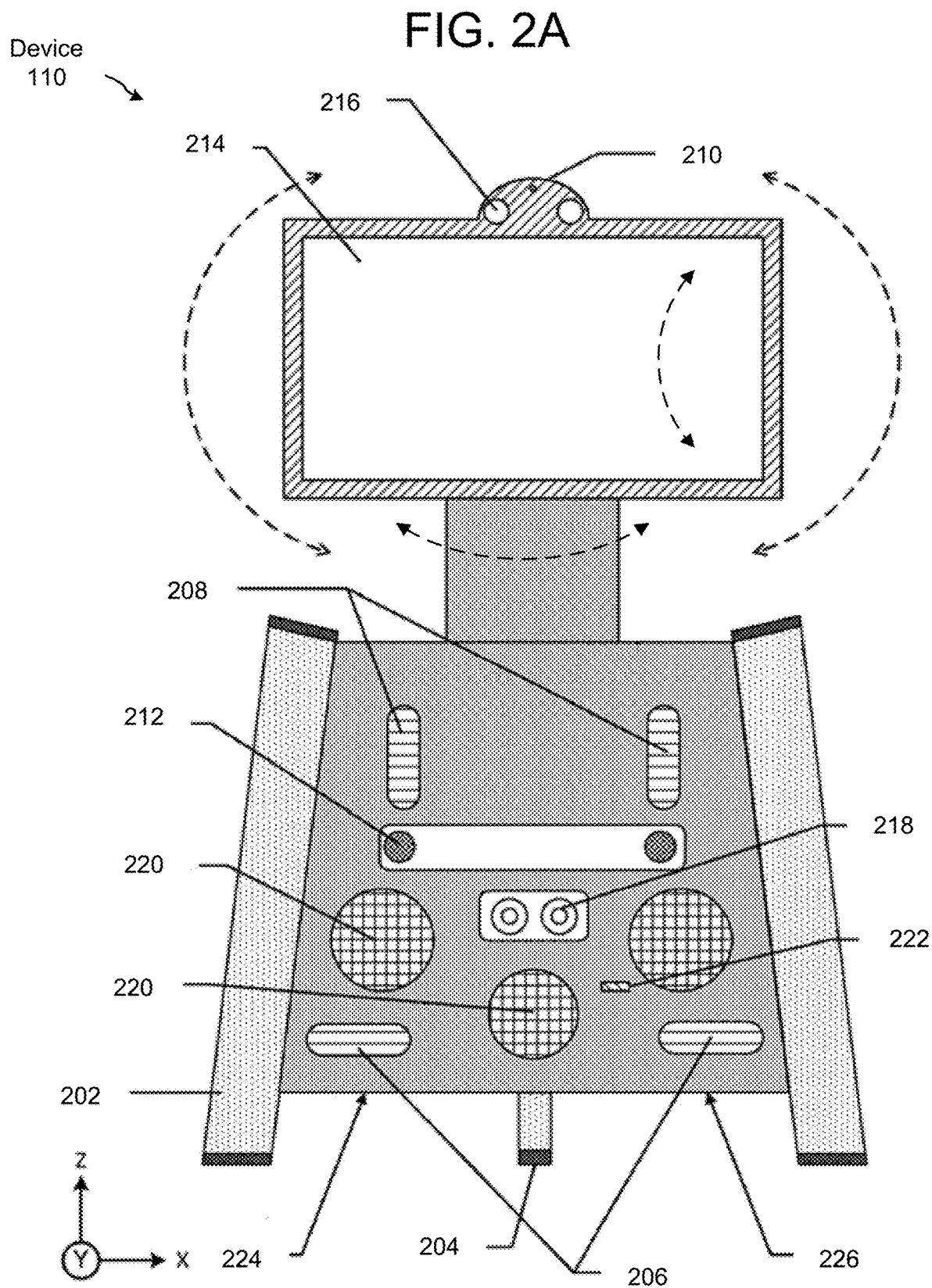
FIGS. 2A, 2B, and 2C illustrate views of a voice-controlled device capable of autonomous motion according to embodiments of the present disclosure.
Figure 2B:
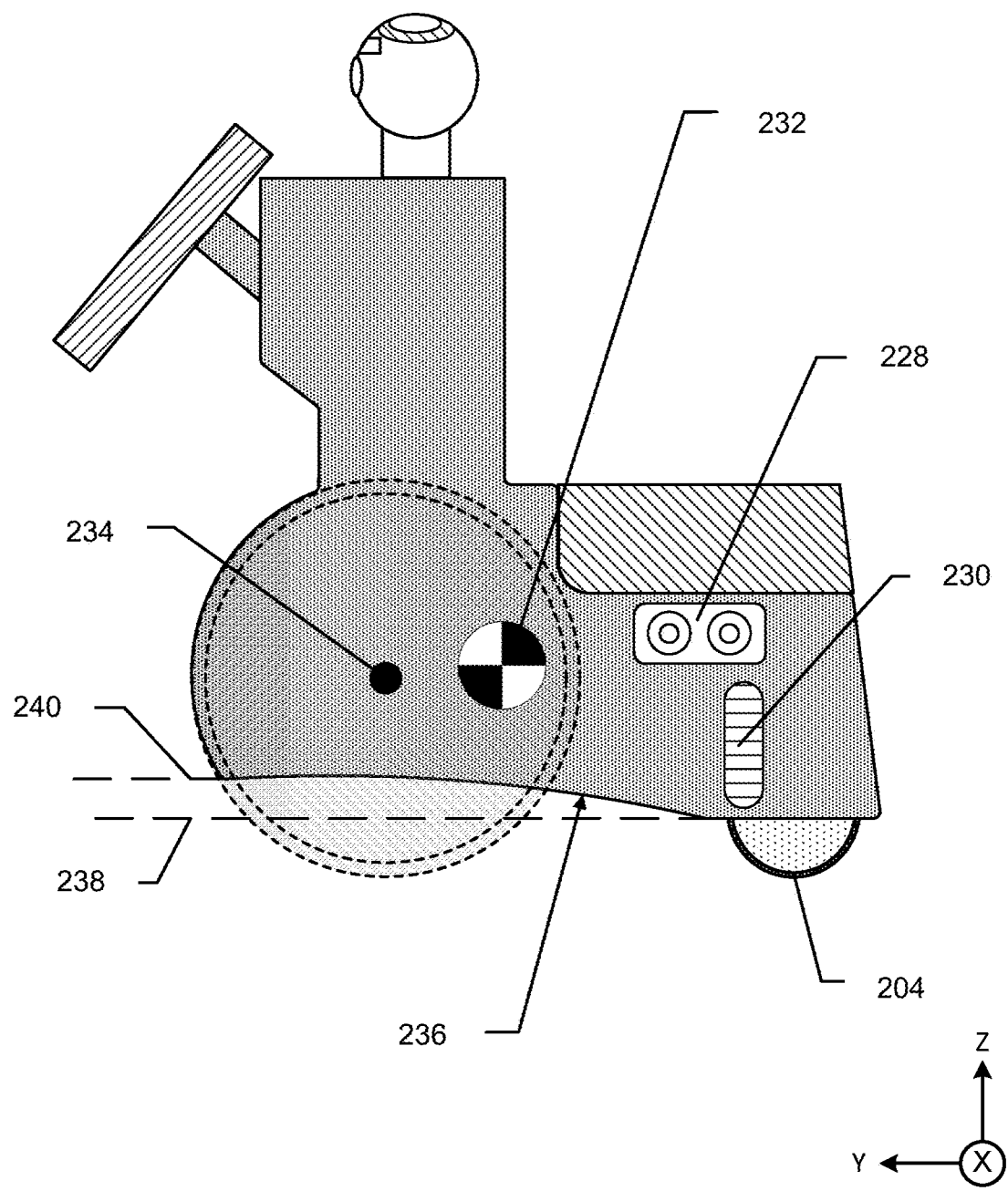
Figure 2C:
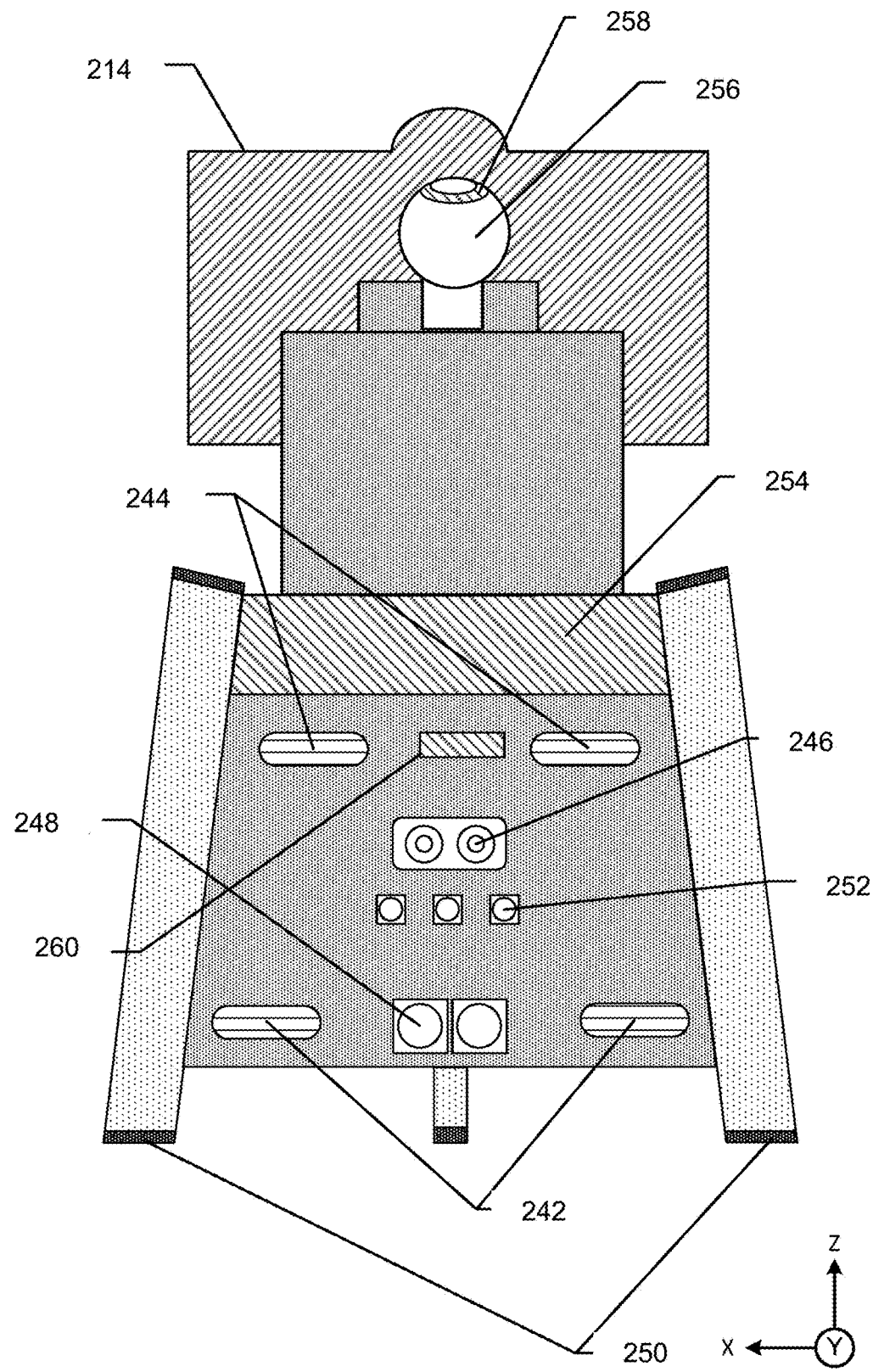

FIGS. 2A, 2B, and 2C illustrate various views of the voice-controlled device 110. FIG. 2A illustrates a front view of the voice-controlled device 110 according to various embodiments of the present disclosure. The device 110 includes wheels 202 disposed on left and right sides of a lower structure. The wheels 202 may be canted inwards toward an upper structure. In other embodiments, however, the wheels 202 may be mounted vertically. A caster 204 (i.e., a smaller wheel) may disposed along a midline of the device 110. The front section of the device 110 may include a variety of external sensors. A first set of optical sensors 206 may be disposed along the lower portion of the front, and a second set of optical sensors 208 may be disposed along an upper portion of the front. A microphone array 210 may be disposed on a top surface of the device 110; the microphone array 210 may, however, be disposed on any surface of the device 110.

One or more cameras 212 may be mounted to the front of the device 110; two or more cameras 212 may be used to provide for stereo vision. The distance between two cameras 212 may be, for example, 5-15 centimeters; in some embodiments, the distance is 10 centimeters. In some embodiments, the cameras 212 may exhibit a relatively wide horizontal field-of-view. For example, the horizontal field-of-view may be between 90° and 110°. A relatively wide field-of-view may provide for easier detection of moving objects, such as users or pets, which may be in the path of the device 110. Also, the relatively wide field-of-view may allow the device 110 to more easily detect objects when rotating or turning.

Cameras 212 used for navigation may be of different resolution from, or sensitive to different wavelengths than, other cameras 212 used for other purposes, such as video communication. For example, navigation cameras 212 may be sensitive to infrared light allowing the device 110 to operate in darkness or semi-darkness, while a camera 216 mounted above a display 214 may be sensitive to visible light and may be used to generate images suitable for viewing by a person. A navigation camera 212 may have a resolution of at least 300 kilopixels each, while the camera 216 mounted above the display 214 may have a resolution of at least 10 megapixels. In other implementations, navigation may utilize a single camera 212.

The cameras 212 may operate to provide stereo images of the environment, the user, or other objects. For example, an image from the camera 216 disposed above the display 214 may be accessed and used to generate stereo-image data corresponding to a face of a user. This stereo-image data may then be used for facial recognition, user identification, gesture recognition, gaze tracking, and other uses. In some implementations, a single camera 216 may be disposed above the display 214.

The display 214 may be mounted on a movable mount. The movable mount may allow the display to move along one or more degrees of freedom. For example, the display 214 may tilt, pan, change elevation, and/or rotate. In some embodiments, the display 214 may be approximately 8 inches as measured diagonally from one corner to another.

An ultrasonic sensor 218 may be mounted on the front of the device 110 and may be used to provide sensor data that is indicative of objects in front of the device 110.

One or more loudspeakers 220 may be mounted on the device 110, and the loudspeakers 220 may have different audio properties. For example, low-range, mid-range, and/or high-range loudspeakers 220 may be mounted on the front of the device 110. The loudspeakers 220 may be used to provide audible output such as alerts, music, human speech such as during a communication session with another user, and so forth.

Other output devices 222, such as one or more lights, may be disposed on an exterior of the device 110. For example, a running light may be arranged on a front of the device 110. The running light may provide light for operation of one or more of the cameras, a visible indicator to the user that the device 110 is in operation, or other such uses.

One or more motion sensors 224, 226 may be disposed on the underside of the device 110; the motion sensors may be, in some embodiments, floor optical-motion sensors. The motion sensors 224, 226 may provide indication indicative of motion of the device 110 relative to the floor or other surface underneath the device 110. In some embodiments, the motion sensors 224, 226 comprise a light source, such as light-emitting diode and/or an array of photodiodes. In some implementations, the motion sensors 224, 226 may utilize an optoelectronic sensor, such as an array of photodiodes. Several techniques may be used to determine changes in the data obtained by the photodiodes and translate this into data indicative of a direction of movement, velocity, acceleration, and so forth. In some implementations, the motion sensors 224, 226 may provide other information, such as data indicative of a pattern present on the floor, composition of the floor, color of the floor, and so forth. For example, the motion sensors 224, 226 may utilize an optoelectronic sensor that may detect different colors or shades of gray, and this data may be used to generate floor characterization data.

FIG. 2B illustrates a side view of the voice-controlled device 110 according to various embodiments of the present disclosure. In this side view, the left side of the device 110 is illustrated. An ultrasonic sensor 228 and an optical sensor 230 may be disposed on either side of the device 110.

The disposition of components of the device 110 may be arranged such that a center of gravity 232 is located between a wheel axle 234 of the front wheels 202 and the caster 204. Such placement of the center of gravity 232 may result in improved stability of the device 110 and may also facilitate lifting by a carrying handle.

The caster 204 is shown in a trailing configuration, in which the caster 204 is located behind or aft of the wheel axle 234 and the center of gravity 232. In other embodiments, the caster 204 may be in front of the axle of the wheels 202. For example, the caster 204 may be a leading caster 204 positioned forward of the center of gravity 232.

The device 110 may encounter a variety of different floor surfaces and transitions between different floor surfaces during the course of its operation. A contoured underbody 236 may transition from a first height 238 at the front of the device 110 to a second height 240 that is proximate to the caster 204. This curvature may provide a ramp effect such that, if the device 110 encounters an obstacle that is below the first height 238, the contoured underbody 236 helps direct the device 110 over the obstacle without lifting the driving wheels 202 from the floor.

FIG. 2C illustrates a rear view of the voice-controlled device 110 according to various embodiments of the present disclosure. In this view, as with the front view, a first pair of optical sensors 242 are located along the lower edge of the rear of the robot 110, while a second pair of optical sensors 244 are located along an upper portion of the rear of the device 110. An ultrasonic sensor 246 may provide proximity detection for objects that are behind the device 110.

Charging contacts 248 may be provided on the rear of the device 110. The charging contacts 248 may include electrically conductive components that may be used to provide power (to, e.g., charge a battery of the device 110) from an external source such as a docking station to the device 110. In other implementations, the battery may be charged wirelessly. For example, wireless inductive or wireless capacitive charging techniques may be used to provide electrical power to the device 110.

In some embodiments, the wheels 202 may include an electrically conductive portion 250 and provide an electrical conductive pathway between the device 110 and a charging source disposed on the floor. One or more data contacts 252 may be arranged along the back of the device 110. The data contacts 252 may be configured to establish contact with corresponding base data contacts within the docking station. The data contacts 252 may provide optical, electrical, or other connections suitable for the transfer of data.

Other output devices 260, such as one or more lights, may be disposed on an exterior of the back of the device 110. For example, a brake light may be arranged on the back surface of the device 110 to provide users an indication that the device 110 is slowing or stopping.

The device 110 may include a modular payload bay 254. In some embodiments, the modular payload bay 254 is located within the lower structure. The modular payload bay 254 may provide mechanical and/or electrical connectivity with the device 110. For example, the modular payload bay 254 may include one or more engagement features such as slots, cams, ridges, magnets, bolts, and so forth that are used to mechanically secure an accessory within the modular payload bay 254. In some embodiments, the modular payload bay 254 includes walls within which the accessory may sit. In other embodiments, the modular payload bay 254 may include other mechanical engagement features such as slots into which the accessory may be slid and engage. The device 110 may further include a mast 256, which may include a light 258.

FIG. 3 illustrates further details of the microphone array 210. In some embodiments, the microphone array 210 includes six microphones 302*a*, 302*b*, 302*c*, 302*d*, 302*e*, and 302*f* arranged in a circular pattern. The present disclosure is not, however limited to any particular number or arrangement of microphones.

The microphone array 210 may include a number of different individual microphones. The individual microphones may capture sound and pass the resulting audio signal(s) created by the sound to a downstream component, as discussed below. Each individual piece of audio data captured by a microphone may be in the time domain. To isolate audio from a particular direction, the device 110 may compare the audio data (or audio signals related to the audio data, such as audio signals in a sub-band domain) to determine a time difference of detection of a particular segment of audio data. If the audio data for a first microphone includes the segment of audio data earlier in time than the audio data for a second microphone, then the device 110 may determine that the source of the audio that resulted in the segment of audio data may be located closer to the first microphone than to the second microphone (which resulted in the audio being detected by the first microphone before being detected by the second microphone).

Figure 4:
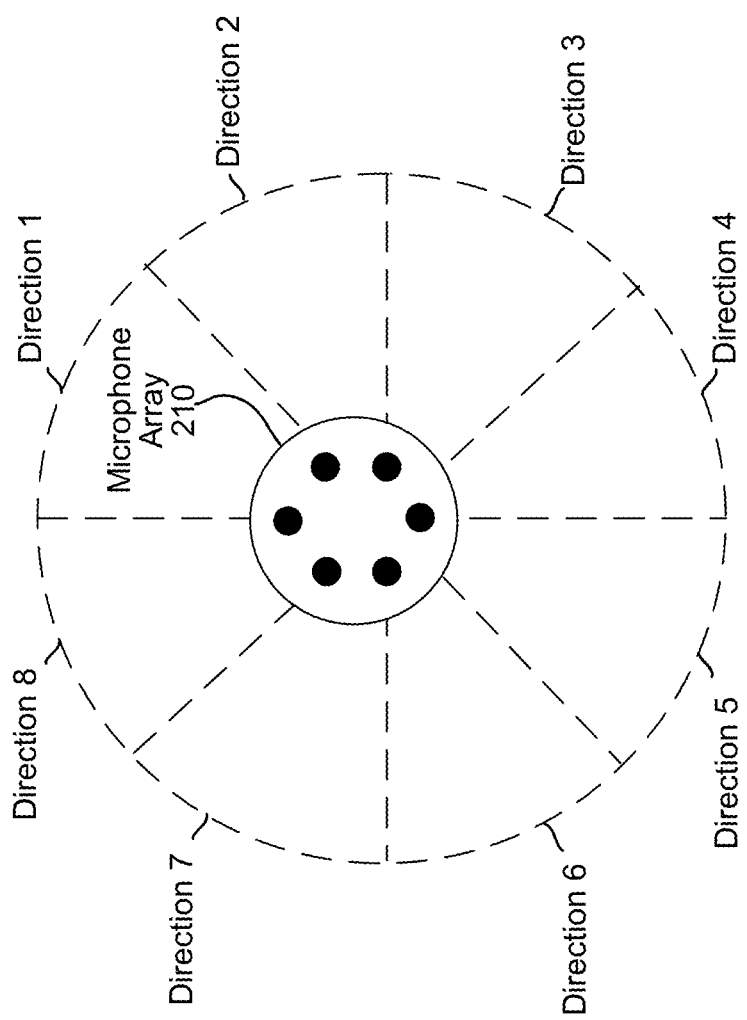
FIG. 4 illustrates associating directions with microphones of a microphone array according to embodiments of the present disclosure.
Figure 5:
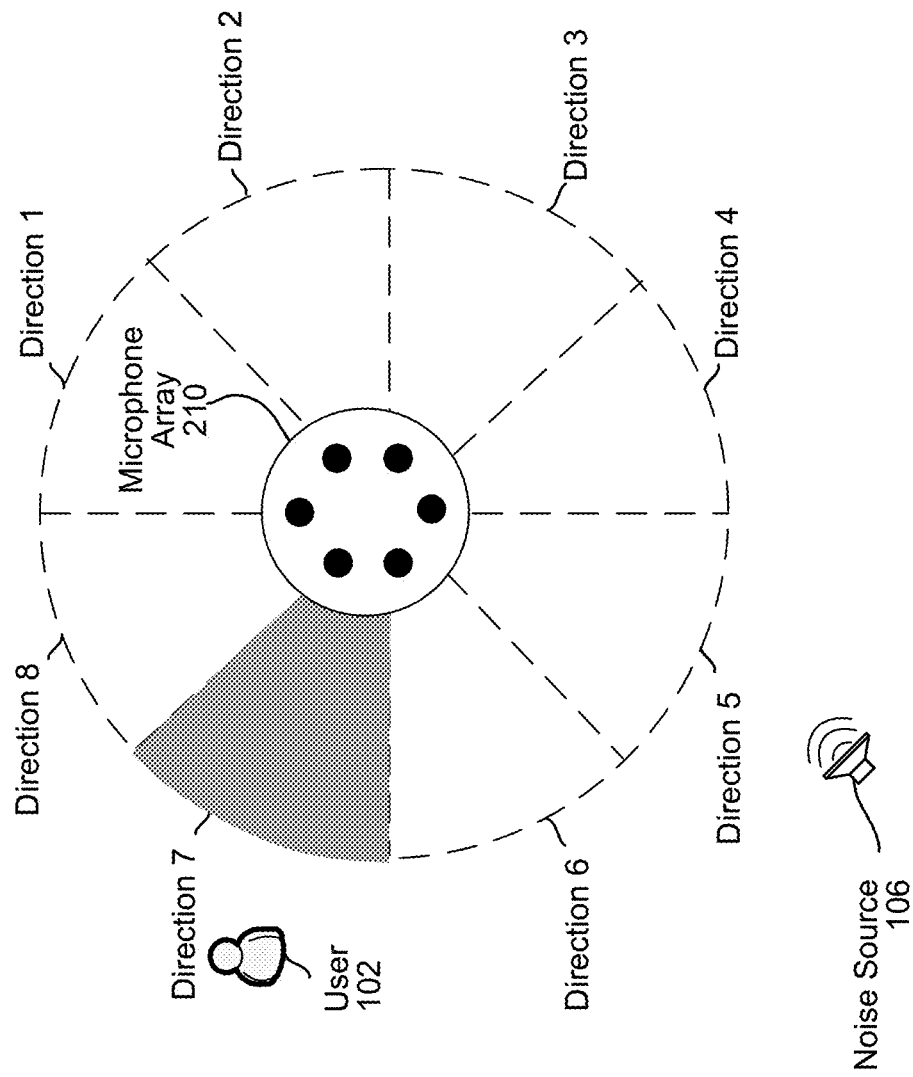
FIG. 5 illustrates isolating audio from a direction to focus on a desired audio source according to embodiments of the present disclosure.

FIGS. 4 and 5 illustrate various aspects of beamforming using the device 110 and the microphone array 210. As shown in FIG. 4, a number of different directions 1-8 may be isolated. Each direction may be associated with a particular microphone of the microphone array 210, in which the azimuth angles for the plane of the microphone array may be divided into bins (e.g., 0-45 degrees, 45-90 degrees, and so forth) where each bin direction is associated with a microphone in the microphone array. For example, direction 1 may be associated with microphone 302*a*, direction 2 may be associated with microphone 302*b*, and so on. Alternatively, particular directions and/or beams may not necessarily be associated with a specific microphone. Thus, the present disclosure is not limited to any particular number of microphones or directions, and the number of microphones and directions may differ from each other.

As shown in FIG. 5, the device 110 may be disposed proximate the user 102 in a direction 7 and a noise source 106 (or other source of audio) in another direction 5. The device 110 may determine, in accordance with embodiments of the present disclosure, that the user 102 is located in a location in direction 7 (the "look" direction). As explained in greater detail below, a fixed beamformer component of the device 110 may isolate audio coming from direction 7 and/or an adaptive beamformer component of the device 110 may remove noise from a noise source 106 in a different direction 5. The device may further dampen noise from other directions relative to the desired audio (e.g., speech from user 102) coming from direction 7.

Figure 6B:
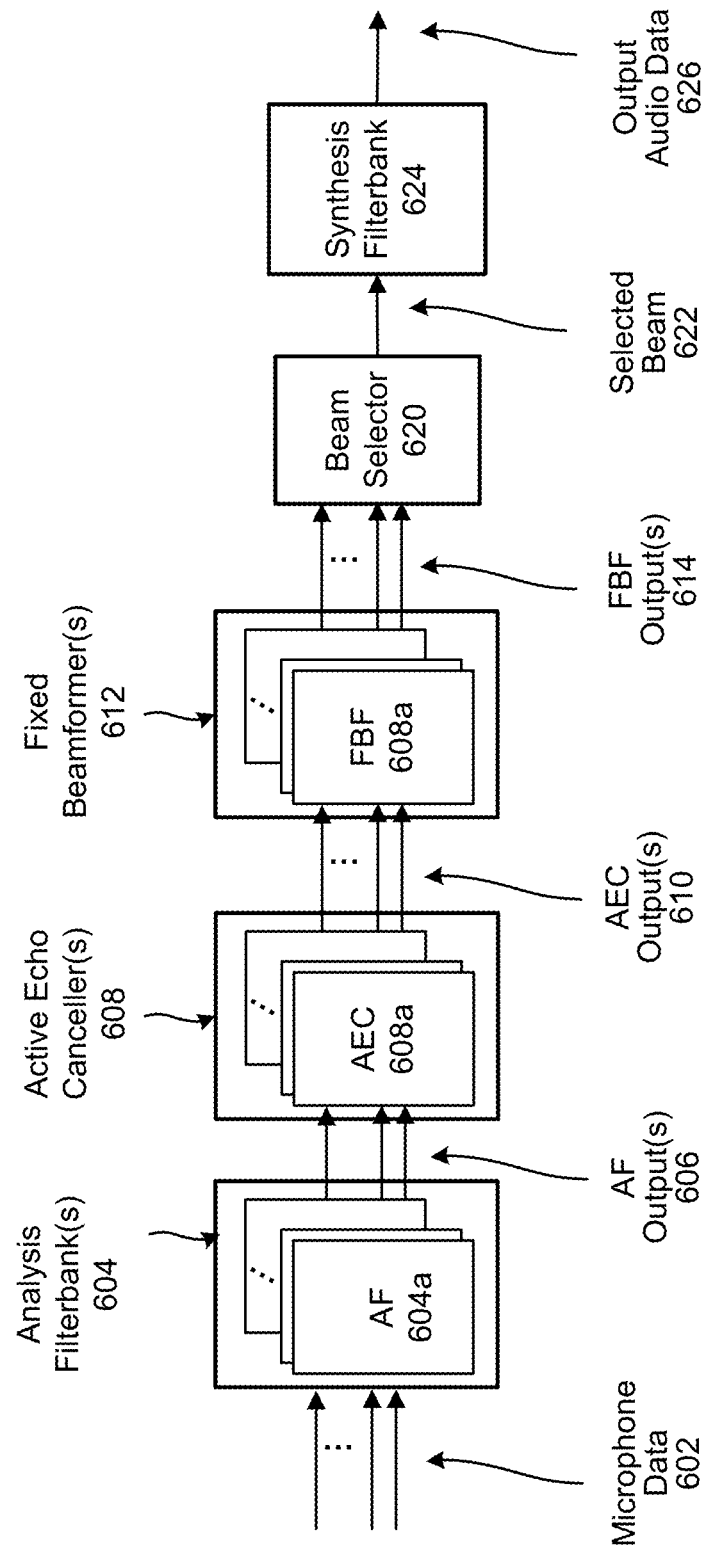
Figure 6C:
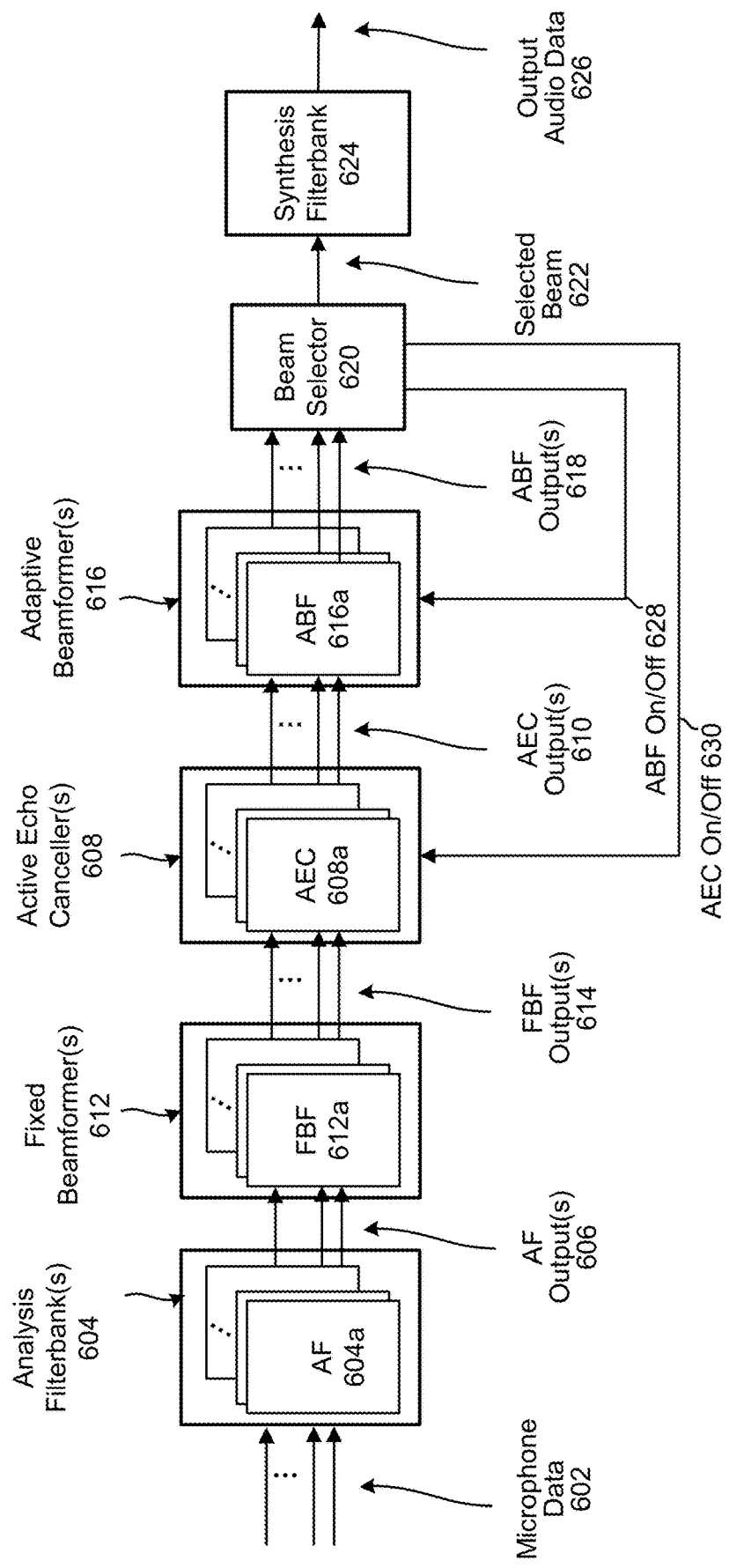

FIGS. 6A, 6B, and 6C illustrate systems for beamforming that includes beam selection according to embodiments of the present disclosure. With reference first to FIG. 6A, the microphone array 210 creates input audio data 602 corresponding to input audio, which may represent an utterance by the user 102. The audio data 602 may be received by an analysis filterbank (AF) component 604, which outputs AF output data 606. An active echo cancellation (AEC) component 608 may receive the AF output data 606 and output AEC output data 610. A fixed beamformer (FBF) component 612 may receive the AEC output data 610 and output FBF output data 614. An adaptive beamformer (ABF) component 616 may receive the FBF output data 614 and output ABF output data 618. A beam selector component 620 may, in accordance with embodiments of the present disclosure, receive the FBF output data 614 and/or the ABF output data 618 and output one or more selected beams 622. A synthesis filterbank component 624 may receive the selected beam 622 and output audio data 626. Each of these components is described in greater detail below.

The analysis filterbank component 604 may convert time-domain input data 602 to frequency-domain AF output data 606; the analysis filterbank component 604 may further divide the AF output data 606 into frequency sub-ranges or "bins." The analysis filterbank 604 may include one or more analysis filterbank sub-components 604*a*, 604*b*, . . . 604*m* corresponding to each microphone and/or frequency bin. The analysis filterbank component 604 may convert the time-domain audio data 602 into frequency-domain AF output data 606 using, for example, a Fourier transform component (such as a Fast Fourier Transform (FFT) component). A separate analysis filterbank sub-component may be used for each frequency bin. In some embodiments, 64 or 128 analysis filterbank sub-components create 64 or 128 different frequency bins represented by the AF output data 606.

The active echo cancellation component 608 may perform acoustic echo cancellation by generating a reference signal based on playback audio data. For example, the input audio data 602 (e.g., input audio data captured by the microphone array 210) is input to the active echo cancellation component 608, and the active echo cancellation component 608 generates the AEC output data 610 by canceling an echo signal based at least in part on the playback audio data.

For example, the playback audio data may correspond to music, and one or more loudspeaker(s) 220 may play the music. The microphone array 210 may capture a portion of the output audio (e.g., capture a portion of the music) and generate the input audio data 602, which may include a representation of the output audio as an "echo signal." Therefore, a portion of the input audio data 602 may correspond to the output audio or echo signal and may interfere with speech processing or other processing that is used to process an utterance (e.g., speech) captured by the microphone array 210 and included in the input audio data 602.

To remove (e.g., cancel) and/or attenuate the echo signal from the input audio data 602, the active echo cancellation component 608 may determine an estimated echo signal based on the playback audio data. For example, the active echo cancellation component 608 may process the playback audio data, synchronize the playback audio data with the input audio data 602, apply one or more adaptive filters to the playback audio data to generate the estimated echo signal, and remove the estimated echo signal from the input audio data 602. Thus, the AEC output data 610 corresponds to the input audio data 602 after removing the estimated echo signal.

A number of AEC sub-components 608a, 608b, . . . 608n included in the active echo cancellation component 608 may correspond to a number of audio channels. In some examples, the active echo cancellation component 608 may include an AEC sub-component for each microphone included in the microphone array 210, such that each input audio data 602 corresponding to each microphone is processed by a separate AEC sub-component. For example, if the microphone array 210 includes six microphones, the active echo cancellation component 608 may include six AEC sub-components. The present disclosure is not, however, limited thereto and the number of microphones and/or AEC sub-components may vary without departing from the disclosure. Additionally or alternatively, a single AEC sub-component may generate the AEC output data 610 for multiple microphones without departing from the disclosure.

The AEC output data 610 is received by a fixed beamformer (FBF) component 612 having one or more FBF sub-components 612a, 612b, . . . 612p; each FBF sub-component may correspond to a different beam and/or frequency bin. The fixed beamformer component 612 may isolate audio from a desired direction by boosting audio received from the desired direction while dampening audio received from a non-desired direction. For example, the fixed beamformer component 612 may include a filter-and-sum structure to boost an audio signal that originates from the desired direction (e.g., the look direction) while attenuating audio signals that originate from other directions.

The number of FBF sub-components included in the fixed beamformer component 612 may correspond to a desired number of beams; each FBF sub-component may generate a signal in the FBF output data 614. For example, to generate twelve beams in the FBF output data 614, the fixed beamformer component 612 may include twelve separate FBF sub-components, with each FBF sub-component processing the AEC output data 610 to generate an individual beam (e.g., directional output, directional audio signal, beamformed audio data, or the like) corresponding to a particular direction. The fixed beamformer component 612 may thus generate fixed beamformer outputs 614, whose number corresponds to the desired number of beams.

Each particular FBF sub-component may be tuned with filter coefficient values to boost audio corresponding to particular beams. For example, a first FBF sub-component may be tuned to boost audio from direction 1, a second FBF sub-component may be tuned to boost audio from direction 2, and so forth. The FBF sub-components may phase-align microphone audio data in a given direction and add it up. Thus, signals that are arriving from a particular direction are reinforced, but signals that are not arriving from that direction are suppressed. The FBF coefficients may be found by solving a constrained convex optimization problem and by taking into account the gain and phase mismatch on the microphones.

The filter coefficient values used to perform the beamforming operation may be calculated offline (e.g., preconfigured ahead of time) and stored in the device 110. For example, the device 110 may store filter coefficient values associated with hundreds of different directional calculations (e.g., hundreds of specific directions) and may select the desired filter coefficient values for a particular beamforming operation at runtime (e.g., during the beamforming operation). For example, at a first time the device 110 may perform a first beamforming operation to divide input audio data into 36 different portions, with each portion associated with a specific direction (e.g., 10 degrees out of 360 degrees) relative to the device 110. At a second time, however, the device 110 may perform a second beamforming operation to divide input audio data into 6 different portions, with each portion associated with a specific direction (e.g., 60 degrees out of 360 degrees) relative to the device 110.

The individual beamformer filter coefficient values may be represented as $H_{BF,m}(r)$, where r=0 . . . R, where R denotes the number of beamformer filter coefficient values in the sub-band domain. Thus, the output Y of the FBF sub-component may be represented as the summation of each microphone signal filtered by its beamformer coefficient and summed up across the M microphones in accordance with the below equation (1).

$$Y(k, n) = \sum_{m=1}^{M} \sum_{r=0}^{R} H_{BF,m}(r) X_m(k, n-r) \qquad (1)$$

The number of microphone outputs 602 and the number of FBF sub-components may not be the same. The number of audio channels included in the microphone outputs 602 and/or the number of beams are typically factors of two (e.g., 2, 4, 6, 8, 12, etc.), although the disclosure is not limited thereto. For example, the microphone array 210 may include eight microphones whereas the fixed beamformer component 612 may generate twelve beams. Additionally or alternatively, the number of audio channels included in the input audio data 602 and the number of beams may be the same without departing from the disclosure.

The FBF output data 614 may be received by the adaptive beamforming component 616, which, as described above, may remove audio data corresponding to a noise source 106 from a desired beam to create the ABF output data 618. The adaptive beamforming component 616 may include ABF sub-components 616a, 616b, . . . 616p. In various embodiments, the adaptive beamforming component 616 includes a minimum-variance distortionless-response (MVDR) beamformer. A MVDR beamformer may apply filter coefficients, or "weights" w, to the frequency-domain signal in accordance with the following equation (2).

$$w = \frac{Q^{-1}d}{d^H Q^{-1}d} \quad (2)$$

In Equation (2), Q is the covariance matrix and may correspond to the cross-power spectral density (CPSD) of a noise field surrounding the device 110, and d is a steering vector that corresponds to a transfer function between the device 110 and a target source of sound located at a distance (e.g., two meters) from the device 110. The covariance matrix may define the spatial relationships between the microphones; this covariance matrix may include a number of covariance values corresponding to each pair of microphones. The covariance matrix is a matrix whose covariance value in a (i,j) position represents the covariance between the $i^{th}$ and $j^{th}$ elements of the microphone arrays. If the greater values of one variable mainly vary with the greater values of the other variable, and the same holds for the lesser values, (e.g., the variables tend to show similar behavior), the covariance is positive. In the opposite case, when the greater values of one variable mainly vary to the lesser values of the other, (e.g., the variables tend to show opposite behavior), the covariance is negative. In some embodiments, the covariance matrix is a spatial covariance matrix (SCM).

For example, a covariance value corresponding to the second row and third column of the matrix corresponds to the relationship between second and third microphones. In various embodiments, the values of the diagonal of the covariance matrix differ for the first and second microphone arrays; the covariance values of the diagonal corresponding to the first microphone may, for example, be greater than the covariance values of the diagonal corresponding to the second microphone. When input audio is processed with the covariance matrix, an utterance from an azimuth direction and/or elevation is more clearly distinguished and better able to be processed with, for example, ASR or speech-to-text processing.

In various embodiments, a different covariance matrix is determined for each of multiple frequency sub-bands. For example, a first covariance matrix is determined for frequencies between 20 Hz and 5 kHz; a second covariance matrix is determined for frequencies between 5 kHz and 10 kHz; a third covariance matrix is determined for frequencies between 10 kHz and 15 kHz; and a fourth covariance matrix is determined for frequencies between 15 kHz and 20 kHz. Any number of covariance matrices for any number or breakdown of frequency sub-bands is, however, within the scope of the present disclosure.

Various machine learning techniques may be used to create the weight values of the covariance matrix. For example, a model may be trained to determine the weight values. Models may be trained and operated according to various machine learning techniques. Such techniques may include, for example, inference engines, trained classifiers, etc. Examples of trained classifiers include conditional random fields (CRF) classifiers, Support Vector Machines (SVMs), neural networks (such as deep neural networks and/or recurrent neural networks), decision trees, AdaBoost (short for "Adaptive Boosting") combined with decision trees, and random forests. In particular, CRFs are a type of discriminative undirected probabilistic graphical models and may predict a class label for a sample while taking into account contextual information for the sample. CRFs may be used to encode known relationships between observations and construct consistent interpretations. A CRF model may thus be used to label or parse certain sequential data, like query text as described above. Classifiers may issue a "score" indicating which category the data most closely matches. The score may provide an indication of how closely the data matches the category.

In order to apply the machine learning techniques, the machine learning processes themselves may be trained. Training a machine learning component such as, in this case, one of the first or second models, requires establishing a "ground truth" for the training examples. In machine learning, the term "ground truth" refers to the accuracy of a training set's classification for supervised learning techniques. For example, known types for previous queries may be used as ground truth data for the training set used to train the various components/models. Various techniques may be used to train the models including backpropagation, statistical learning, supervised learning, semi-supervised learning, stochastic learning, stochastic gradient descent, or other known techniques. Thus, many different training examples may be used to train the classifier(s)/model(s) discussed herein. Further, as training data is added to, or otherwise changed, new classifiers/models may be trained to update the classifiers/models as desired.

A beam selector 620 receives the FBF output data 614 and/or the ABF output data 618 and, in accordance with the present disclosure, selects data corresponding to a selected beam 622. The beam selector 620 may select one or more of the beams as output beams 622. For example, the beam selector 620 may determine one or more signal quality values (e.g., loudness, signal-to-noise ratio (SNR), signal-to-interference ratio (SIR), power value, signal-to-noise plus interference ratio (SINR) associated with each of the FBF output data 614 and may select the FBF output data 614 having the highest signal quality metric as the output beam(s). In accordance with embodiments of the present disclosure, and as discussed in greater detail with reference to FIG. 7, the beam selector 620 may select the selected beam 622 based at least in part on a change in magnitude data corresponding to the FBF output data 614 and/or the ABF output data 618. In various embodiments, the beam selector 620 is capable of selecting a new beam every 100-200 milliseconds.

A synthesis filterbank component 624 may be used to convert the frequency-domain data back to time-domain output audio data 626 using, for example, an inverse Fourier transform component (such as an Inverse Fast Fourier Transform (IFFT) component). The synthesis filterbank component 624 may receive the selected beam 622, which may include frequency data corresponding to each frequency bin. The synthesis filterbank component 624 may include sub-components for each frequency bin. The frequency data may be combined first and then converted to time domain data. The audio output data 626 may thus be time-domain audio data.

With reference to FIG. 6B, as mentioned above, in some embodiments, the beamforming system does not include the adaptive beamformer component 616; in these embodiments, the beam selector 620 receives the FBF output data 614 directly from the fixed beamforming component 612. With reference to FIG. 6C, as explained in greater detail below, the beam selector may send an on/off signal 628 to the adaptive beamformer component 616 to turn the adaptive beamformer component 616 on or off. Similarly, the beam selector may send an on/off signal 630 to the acoustic echo cancellation component 608 to turn the acoustic echo cancellation component 608 on or off.

Figure 7:
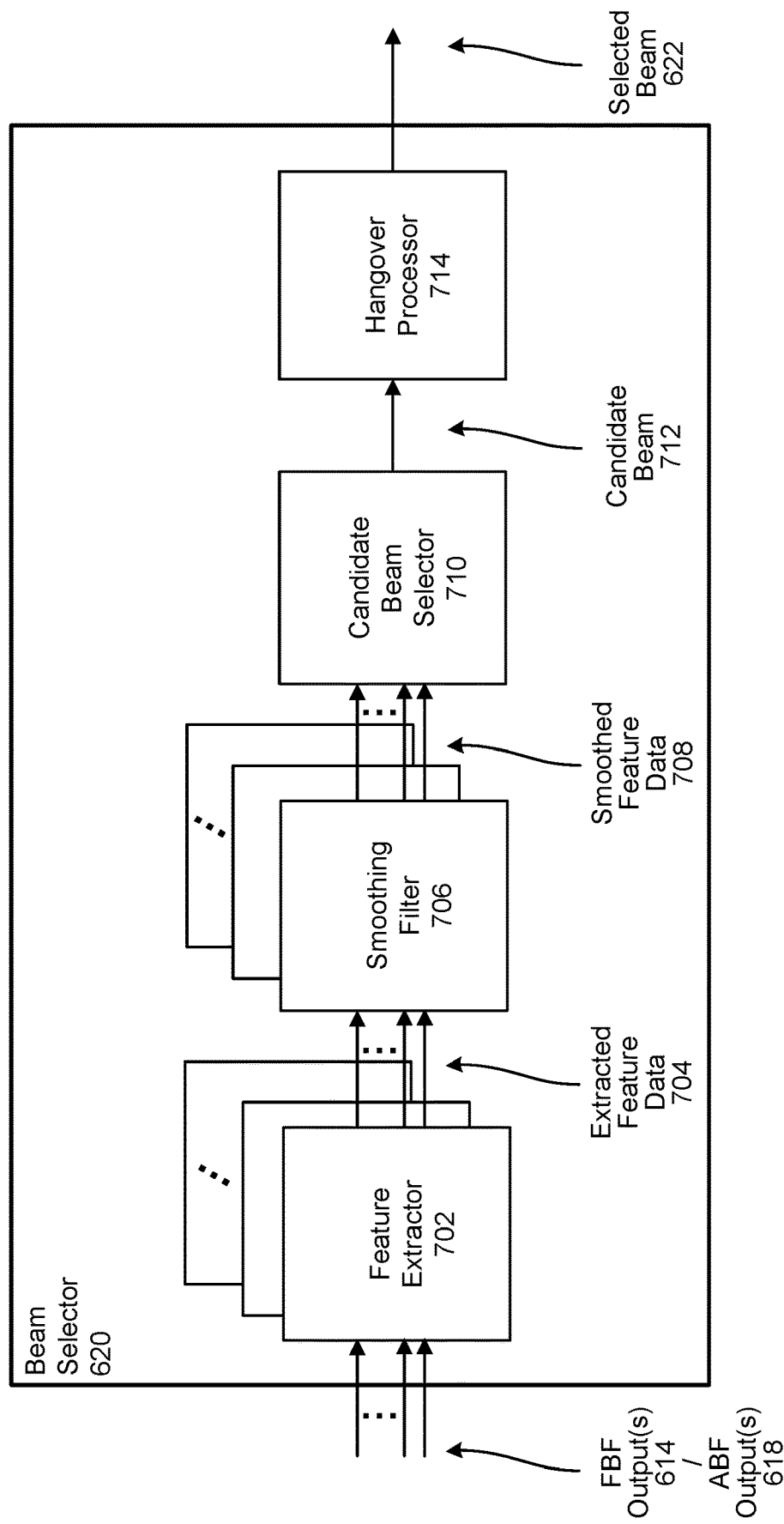
FIG. 7 illustrates a beam selector component according to embodiments of the present disclosure.

FIG. 7 is a block diagram illustrating a system for selecting a beam in accordance with embodiments of the present disclosure. A feature extractor 702 receives the FBF output data 614 and/or the ABF output data 618 and generates extracted feature data 704. A smoothing filter 706 receives the extracted feature data 704 and generates smoothed feature data 708. A candidate beam selector 710 selects a candidate beam 712 based on the smoothed feature data. A hangover processor 714 selects the selected beam 622 based at least in part on the candidate beam. Each of these components is discussed in greater detail below.

Referring first to the feature extractor 702, the feature extractor 702 may determine, for each frame of audio data, one or more features related to the frame of the audio data. Example features include audio loudness and/or power magnitude data (as represented by, e.g., a distance of an audio signal from a horizontal axis or the square of that distance), zero crossing rate, spectral slope, and spectral centroid. The feature extractor 702 may determine the features for each beam and for each frequency bin per beam. For example, if there are 8 beams and 64 frequency bins, the feature extractor 702 may determine 512 features per frame. A frame of audio data may correspond to 4 or 8 milliseconds of audio data. In some embodiments, the feature extractor 702 determines features of groups of frames—e.g., the feature extractor creates longer frames by combining the smaller frames. The longer frames may, for example, correspond to 100-200 milliseconds of audio data.

A variation in the magnitude data may correspond to a spectral flux of the audio data. The spectral flux may be a measure of how quickly the magnitude spectrum of the audio data varies from one or more first frames to one or more second frames. The spectral flux may be determined by comparing a magnitude spectrum corresponding to one frame against the magnitude spectrum from one or more previous frames.

The magnitude spectrum may be determined for each frequency bin and for each beam. Each frequency bin may correspond to data representing a plurality of data points; each data point may represent a magnitude of the audio data at a given frequency. The data points may thus represent the frequency spectrum of the audio data corresponding to that frequency bin. The number of the data points may correspond to a sampling rate of the time-domain audio signal.

The magnitude data corresponding to the frequency bin may be determined by averaging the data points in that bin to determine an average magnitude of the frequency bin. The variation in magnitude may then be determined by determining a difference between an average magnitude of a frequency bin corresponding to a first frame of audio data and an average magnitude of that frequency bin corresponding to a second frame of audio data. In other embodiments, the variation in magnitude may be found by finding the Euclidian distance between a first set of data points corresponding to a frequency bin for a first frame and a second set of points corresponding to the frequency bin for a second frame. The Euclidian distance may be determined by determining distances between each data point in a frequency bin for a first frame and each corresponding data point for a second frame and then summing or averaging the distances. For example, if a frequency bin has 10 data points, a first distance between the first point of a first frame and the first point of a second frame is determined, a second distance between the second point of a first frame and the second point of a second frame is determined, etc., and the first, second, etc. distances are summed or averaged.

The feature extractor 702 may store features determined for one or more previous audio frames and generate features that represent an amount of change between the features of one or more previous audio frames and features of a current audio frame. For example, the feature extractor 702 may determine, for a previous frame of audio data, first magnitude data corresponding to each beam for each frequency bin. The feature extractor 702 may further determine, for a current frame of audio data, second magnitude data corresponding to each beam for each frequency bin. The feature extractor 702 may then determine the extracted feature data 704 based on the change in magnitudes between the previous frame i−1 and the current frame i in accordance with the below equation (3).

$$\Delta X_i(k) = |X_i(k)| - |X_{i-1}(k)| \quad (3)$$

In the above equation (3), i is the audio data frame number, k is the frequency bin number, and $|X_i(k)|$ is the magnitude spectrum of a frequency bin k of and frame i of audio data. The total change in magnitude between a current frame i and a previous frame i−1 for a given beam, Y(i), is defined by the below equation (4), in which b is the beam number.

$$Y_b(i) = \Sigma_k \Delta X_i(k) \quad (4)$$

The feature extractor 702 may include a measurement component for determining the magnitude data corresponding to each beam in each frequency bin, a comparison component for determining the different between magnitude data corresponding to a previous frame and magnitude data corresponding to a current frame, and a storage component for storing magnitude data corresponding to the previous frame or frames. The feature extractor 702 may determine an average variation in magnitude over a period of time, such as a period of time corresponding to 80 audio fames. This average variation may be a running average that is updated for each new audio frame or group of audio frames. The feature extractor 702 may output extracted feature data 704 for each new frame. For each new frame, the feature extractor 702 may include the variation in magnitude of the current frame (e.g., the $1^{st}$, most recent frame) in the running average and may remove the variation in magnitude from the oldest frame (for example, the $81^{st}$, oldest frame) from the running average. The feature extractor 702 may save the variation in magnitude for each frame in a computer memory, such as the queue described with reference to FIG. 9. To compute the running average for a new frame of audio data, the feature extractor 702 may remove a variation in magnitude corresponding to the oldest frame (for example, the $81^{st}$ frame) from the computer memory and add a variation in magnitude corresponding to the newest frame (for example, the $1^{st}$ frame) from the computer memory and then compute the new average of the variations in magnitude corresponding to all the frames (e.g., the 80 frames) in the computer memory.

The smoothing filter 706 may be used to smooth the extracted feature data 704, the variation in magnitude of the extracted feature data 704, and/or the running average of the variation in magnitude of the extracted feature data 704 to create smoothed feature data 708. The smoothing filter 706 may be a finite impulse-response (FIR) filter, an infinite impulse-response (IIR) filter, or other type of filter. The smoothing filter 706 may have an attack time representing how quickly it responds (e.g., how much time passes before the output matches the input) to increases in the extracted feature data 704. The extracted feature data 704 may include, for example, the change in magnitudes for each frequency bin and for each beam, as discussed above. The extracted feature data 704 may thus increase when the amount of variation in the audio data increases due to the presence of an utterance from a speaker disposed in a direction associated with the beam. A short attack time corresponds to the smoothing filter 706 responding quickly to increases in the extracted feature data 704, while a long attack time corresponds to the smoothing filter 706 responding slowly to increases in the extracted feature data 704. Similarly, the smoothing filter 706 may have a decay time representing how quickly it responds to decreases in the extracted feature data 704. The extracted feature data 704 may include, for example, the change in magnitudes for each frequency bin and for each beam, as discussed above. The extracted feature data 704 may thus decrease when the amount of variation in the audio data decreases due to the absence of an utterance from a speaker disposed in a direction associated with the beam. A short decay time corresponds to the smoothing filter 706 responding quickly to decreases in the extracted feature data 704, while a long decay time corresponds to the smoothing filter 706 responding slowly to decreases in the extracted feature data 704. In some embodiments, a running average of the smoothed feature data 708 is determined over a number of frames, such as 80 frames, as described above with reference to the running average of the variation in the extracted feature data 704. This running average of the smoothed feature data 708 may be determined instead of or in addition to the running average of the variation in the extracted feature data 704. Smoothed feature data 708 corresponding a number of frames, such as 80 frames, may be similarly stored in a computer memory; new smoothed feature data 708 may be added to the computer memory and old smoothed feature data 708 may be added to the computer memory, as described above, and a new running average of the stored smoothed feature data 708 may similarly be computed upon determination of new smoothed feature data 708 corresponding to new frame or group of new frames.

In some embodiments, the smoothing filter 706 is configured to have a short attack time and a relatively longer decay time. This type of filter may be referred to as a fast-attack and slow-release (FA-SR) filter. The decay time may be, in some embodiments, 10-100 times longer than the attack time. The attack time may be, for example, 0.01 seconds, while the decay time may be 0.5-0.6 seconds. The smoothing filter 706 may smooth extracted feature data 704 corresponding to a number of frames of audio data; in other words, the smoothed feature data 708 may depend on a number of previously received elements of the extracted feature data 704. In some embodiments, the smoothing filter 706 smooths extracted feature data 704 corresponding to 80 previous frames, which may correspond to 600 milliseconds of audio data.

Though the feature extractor 702 and the smoothing filter 706 are illustrated as separate components, the feature extractor 702 and the smoothing filter 706 may be implemented as a single component that both extracts features and smooths the features.

The candidate beam selector 710 receives the smoothed feature data 708 and selects a candidate beam 712 having a greatest amount of variation in magnitude data in accordance with the below equation (5).

$$\text{candidate beam} = \operatorname{argmax}_b[Y_b(i)] \quad (5)$$

Sources of noise, such as wind, blenders, vacuum cleaners, and other such sources of noise, tend to have less variation in their frame-by-frame audio magnitude; human speech, however, tends to have greater variation in its frame-by-frame audio magnitude. Thus, by selecting the beam having the greatest frame-by-frame audio magnitude in accordance with equation (5), the candidate beam selector 710 selects the beam having the greatest probability of corresponding to a source of the speech.

In some embodiments, the candidate beam selector 710 selects two or more beams as candidate beams. If, for example, two or more beams have a same amount of variation in frame-by-frame audio magnitude, the candidate beam selector 710 may output the two or more beams as candidate beams 712. The candidate beam selector 710 may further output two or more beams as candidate beams 712 if the two or more beams have amounts of variation in their frame-by-frame audio magnitude within a threshold, such as 1%-10%. The candidate beam selector 710 may further be configured to always output two or more beams as candidate beams 712.

In some embodiments, the candidate beam selector 710 compares the amount of variation in the frame-by-frame audio magnitude to one or more thresholds before selecting a candidate beam 712. If, for example, the amount of variation in the frame-by-frame audio magnitude for a first beam exceeds a first threshold, the candidate beam selector 710 may select a second beam as the candidate beam if the second beam corresponds to amount of variation in the frame-by-frame audio magnitude that is lower than the first threshold. Music, for example, tends to have an amount of variation in its frame-by-frame audio magnitude greater than speech; by selecting a beam having an amount of variation in its frame-by-frame audio magnitude less than the first threshold, the candidate beam selector 710 may omit a beam corresponding to a source of music, such as a stereo or loudspeaker. Given a range of the amount of variation in frame-by-frame audio magnitude normalized between 0.0 and 1.0, wherein 0.0 is no variation and 1.0 is maximum variation, music may correspond to a range of variation between a minimum threshold and the maximum variation. The minimum threshold may be between 0.7-0.9; in some embodiments, the minimum threshold is 0.8.

The candidate beam selector 710 may further compare the amount of variation in the frame-by-frame audio magnitude to a second threshold. If a given candidate beam 712 has an amount of variation in its frame-by-frame audio magnitude less than the second threshold, the candidate beam selector 710 may not select that beam as the candidate beam 712 (even if that beam is the beam having the maximum variation in its frame-by-frame audio magnitude and it means that the candidate beam selector 710 outputs no beam as the candidate beam 712). The second threshold may be between 0.1-0.3 and, in some embodiments, 0.2 (referring again to the normalized 0.0-1.0 scale). Amounts of variation in the frame-by-frame audio magnitude less than the second threshold may correspond to noise, not speech.

The candidate beam selector 710 may, in some embodiments, turn off the active echo cancellation component 608 and/or the adaptive beamformer component 616 using the control signals 628 and/or 630 as shown in FIG. 6C. In some situations, use of the active echo cancellation component 608 and/or the adaptive beamformer component 616 may be detrimental in the operation of the beam selector 620, which may be improved if they are turned off. The candidate beam selector 710 may turn off one or both of the active echo cancellation component 608 and/or the adaptive beamformer component 616 if no beam is found to correspond to an amount of variation in its frame-by-frame audio magnitude greater than the second threshold (e.g., no voice is detected), if all beams are found to correspond to an amount of variation in its frame-by-frame audio magnitude less than the first threshold (e.g., music is detected on all beams), and/or if multiple beams are found to an amount of variation in their frame-by-frame audio magnitude greater than the second threshold and less than the first threshold (e.g., multiple voice beams are detected).

The beam selector 620 may, in some embodiments, include a SNR component for performing SNR-based beam selection, in which a beam corresponding to a highest SNR is selected. If, for example, the candidate beam selector 710 selects a first plurality of beams, and the SNR-based beam selector selects a second, different plurality of beams, the candidate beam selector 710 may output only the beams common to both the first plurality and the second plurality. In other embodiments, the SNR-based beam selector determines a confidence score associated with each of its selected beams; the candidate beam selector 710 may select a beam selected by the SNR-based beam selector if the confidence score is greater than a threshold.

The beam selector 620 may, in some embodiments, include a SIR component for performing SIR-based beam selection, in which one or more beams having a SIR higher than a threshold are eliminated before the rest of the beams are processed by the feature extractor 702. Beams having a high SIR are likely to correspond to sources of noise and may thus be eliminated for consideration as the selected beam 622.

In some embodiments, the beam selector 620 sends, to a speech-recognition system, an indication of voice-activity detection upon selection of the selected beam 622. The beam selector 620 may, in some embodiments, send this indication only if the amount of variation in the frame-by-frame audio magnitude of the selected beam 622 is greater than the second threshold and/or less than the first threshold.

FIGS. 8A, 8B, and 8C illustrate exemplary magnitude spectrums according to embodiments of the present disclosure. FIG. 8A illustrates, for a previous frame of audio data, determined audio magnitudes for four beams and six frequency bins. For example, the audio magnitude for the second beam and first bin is 1.1. As described above, the feature extractor 702 may store one or more magnitude spectrums for one or more previous frames of audio data in a computer memory. FIG. 8B illustrates, for a current frame of audio data, determined audio magnitudes for the four beams and the six frequency bins. For example, the audio magnitude for the second beam and first bin is 2.1.

FIG. 8C illustrates a spectrum corresponding to changes in the audio magnitude with respect to the previous frame and the current frame. For example, the audio magnitude for the second beam and first frequency bin has changed by 1.0. Because this change of 1.0 represents the greatest change in audio magnitude, in this example, the candidate beam selector 710 selects the second beam as the candidate beam 712.

FIG. 9 illustrates operation of the hangover processor 714 according to embodiments of the present disclosure. As the term is used herein, "hangover" refers to an amount of time that a particular candidate beam 712 is continually selected, or "hangs over." The hangover processor 714 requires that the candidate beam 712 be selected for a minimum amount of time before selecting it as the selected beam 622 to thus prevent too-rapid switching back-and-forth between two or more beams. The hangover processor thus determines a minimum switching frequency for beam selection; if a first beam is first selected and then, at a later time, a second beam is selected as a candidate beam, the hangover processor does not permit selection of the candidate beam as the selected beam until at least the minimum amount of time has elapsed. The hangover processor 714 may thus be referred to a hysteresis processor that adds hysteresis delay time to the selection of the selected beam 622. The hysteresis delay time may be, for example, 1-10 seconds, corresponding to a minimum switching frequency of 0.1-1 Hertz. By using the hysteresis delay time, the hangover processor 714 may prevent the selected beam 622 from changing from a first beam to a second beam until the hysteresis delay time has expired.

In various embodiments, the hangover processor 714 includes a hangover timer that is initially set at the minimum amount of delay time between switching, which may be, for example, 100-200 milliseconds. When the hangover processor 714 receives a new candidate beam 712, it stores (902) an indication of the candidate beam 712 in a computer memory, such as a queue. The number of indications of candidate beams 712 stored in the queue may be equal to the minimum amount of delay time divided by the frame size; older entries in the queue may be deleted as new entries are added. The hangover processor 714 then checks (904) if the hangover timer has expired (e.g., it has decreased to zero, indicating that the delay time has elapsed). If not, the hangover processor 714 decrements (906) the hangover timer and outputs (908) the previous candidate beam 712 as the selected beam 622.

If, however, the delay time has expired, the hangover processor 714 then checks (910) to see if the amount of variation in the frame-by-frame audio magnitude corresponding to the candidate beam 712 is less than a threshold. The threshold may be, again using a normalized scale of 0.0 to 1.0, 0.01. The hangover processor 714 may further check to see if the amount of variation in the frame-by-frame audio magnitude corresponding to the candidate beam 712 is much greater than a next-highest amount of variation in the frame-by-frame audio magnitude of another beam; in some embodiments, 100 times greater. If either of these conditions is true, the hangover processor 714 similarly outputs (908) the previous candidate beam 712 as the selected beam 622.

The hangover processor 714 then checks (912) to see if the candidate beam 712 is the same as a previously selected candidate beam 712. If so, the hangover processor sets (914) the hangover timer and outputs (908) the previous candidate beam 712 as the selected beam 622. If, however, the beams are different, the hangover processor selects (916) the selected beam 622 as the beam having the most entries in the queue.

FIG. 10 is a block diagram conceptually illustrating example components of the device 110. In operation, the device 110 may include computer-readable and computer-executable instructions that reside on the device, as will be discussed further below.

The device 110 may include one or more audio capture device(s), such as a microphone array 210 which may include a plurality of microphones. The audio capture device(s) may be integrated into a single device or may be separate. The device 110 may also include a built-in audio output device for producing sound, such as built-in loudspeaker(s) 220. The audio output device may be integrated into a single device or may be separate. The device 110 may include an address/data bus 1024 for conveying data among components of the device 110. Each component within the device may also be directly connected to other components in addition to (or instead of) being connected to other components across the bus 1024.

The device 110 may include one or more controllers/processors 1004, which may each include a central processing unit (CPU) for processing data and computer-readable instructions, and a memory 1006 for storing data and instructions. The memory 1006 may include volatile random access memory (RAM), non-volatile read only memory (ROM), non-volatile magnetoresistive (MRAM) and/or other types of memory. The device 110 may also include a data storage component 1008 for storing data and controller/processor-executable instructions (e.g., instructions to perform operations discussed herein). The data storage component 1008 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 1002.

Computer instructions for operating the device 110 and its various components may be executed by the controller(s)/processor(s) 1004, using the memory 1006 as temporary "working" storage at runtime. The computer instructions may be stored in a non-transitory manner in non-volatile memory 1006, storage 1008, or an external device. Alternatively, some or all of the executable instructions may be embedded in hardware or firmware in addition to or instead of software.

The device 110 may include input/output device interfaces 1002. A variety of components may be connected through the input/output device interfaces 1002, such as the microphone array 210, the built-in loudspeaker(s) 220, and a media source such as a digital media player (not illustrated). The input/output interfaces 1002 may include A/D converters and/or D/A converters.

The input/output device interfaces 1002 may also include an interface for an external peripheral device connection such as universal serial bus (USB), FireWire, Thunderbolt or other connection protocol. The input/output device interfaces 1002 may also include a connection to one or more networks 1099 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 1099, the device 110 may be distributed across a networked environment.

Multiple devices may be employed in a single device 110. In such a multi-device device, each of the devices may include different components for performing different aspects of the processes discussed above. The multiple devices may include overlapping components. The components listed in any of the figures herein are exemplary, and may be included a stand-alone device or may be included, in whole or in part, as a component of a larger device or system.

Figure 11:
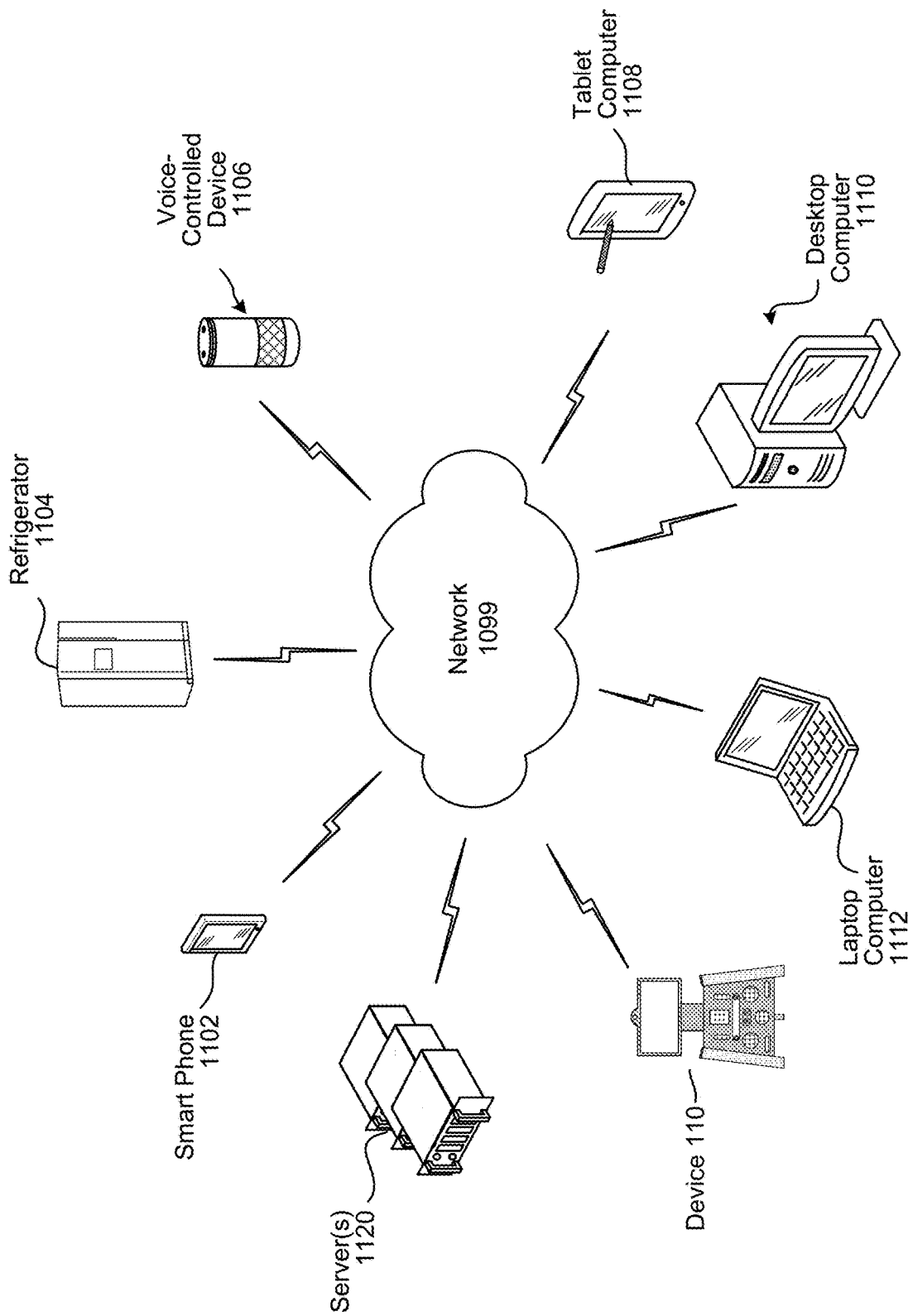
FIG. 11 illustrates a network including a device for beamforming according to embodiments of the present disclosure.

As illustrated in FIG. 11, the device 110 may be connected to a network(s) 1099. The network(s) 1099 may include a local or private network or may include a wide network such as the Internet. Devices may be connected to the network(s) 1099 through either wired or wireless connections. For example, the device 110, a smart phone 1102, a smart refrigerator 1104, a voice-controlled device 1106, a tablet computer 1108, a desktop computer 1110, and/or a laptop computer 1112 may be connected to the network(s) 1099 through a wireless service provider, over a WiFi or cellular network connection, or the like. Other devices are included as network-connected support devices, such as a server 1120. The support devices may connect to the network(s) 1099 through a wired connection or wireless connection.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of digital signal processing and echo cancellation should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. Some or all of the device 110 may be implemented by a digital signal processor (DSP).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving first audio data corresponding to a first direction relative to a device and corresponding to a first time period;
   receiving second audio data corresponding to a second direction relative to the device and corresponding to the first time period;
   receiving third audio data corresponding to the first direction and corresponding to a second time period after the first time period;
   receiving fourth audio data corresponding to the second direction and corresponding to the second time period;
   determining first difference data using the first audio data and the third audio data;
   determining second difference data using the second audio data and the fourth audio data;
   based at least in part on determining that the first difference data is greater than the second difference data, generating output data corresponding to the first audio data and the third audio data; and
   sending the output data to a speech processing system.

2. The computer-implemented method of claim 1, wherein:
   determining the first difference data comprises:
      determining a first magnitude and a second magnitude corresponding to the first audio data; and
      determining a third magnitude and a fourth magnitude corresponding to the third audio data,
   determining the second difference data comprises:
      determining a fifth magnitude and a sixth magnitude corresponding to the second audio data; and
      determining a seventh magnitude and an eighth magnitude corresponding to the fourth audio data, and
   determining that the first difference data is greater than the second difference data comprises:
      determining a first difference between the first magnitude and the third magnitude;
      determining a second difference between the second magnitude and the fourth magnitude;
      determining a third difference between the fifth magnitude and the seventh magnitude;
      determining a fourth difference between the sixth magnitude and the eighth magnitude; and
      determining that a sum of the first difference and the third difference is greater than a second sum of the second difference and the fourth difference.

3. The computer-implemented method of claim 1, wherein:
   determining the first difference data comprises:
      determining a first average magnitude corresponding to the first audio data; and
      determining a third average magnitude corresponding to the third audio data,
   determining the second difference data comprises:
      determining a second average magnitude corresponding to the second audio data; and
      determining a fourth average magnitude corresponding to the fourth audio data, and
   determining that the first difference data is greater than the second difference data comprises:
      determining that a first difference between the first average magnitude and the third average magnitude is greater than a second difference between the second average magnitude and the fourth average magnitude.

4. The computer-implemented method of claim 1, wherein:
   determining a first running average based at least in part on the first difference data; and
   determining a second running average based at least in part on the second difference data,
   wherein determining that the first difference data is greater than the second difference data further comprises determining that the first running average is greater than the second running average.

5. The computer-implemented method of claim 1, wherein determining the first difference data further comprises:
   determining a first signal-to-noise ratio corresponding to the first audio data; and
   determining a second signal-to-noise ratio corresponding to the second audio data,
   wherein sending the output data is further based at least in part on determining that the first signal-to-noise ratio is greater than the second signal-to-noise ratio.

6. The computer-implemented method of claim 1, wherein determining the first difference data further comprises:
   determining a first signal-to-interference ratio corresponding to the first audio data; and
   determining a second signal-to-interference ratio corresponding to the second audio data,
   wherein sending the output data is further based at least in part on determining that the first signal-to-interference ratio is less than the second signal-to-interference ratio.

7. The computer-implemented method of claim 1, further comprising:
   determining a threshold corresponding to a first amount of variation in magnitude, the first amount of variation associated with variation of audio data representing music; and
   prior to sending the output data, determining that a second amount of variation in the first difference data is less than the threshold.

8. The computer-implemented method of claim 5, further comprising:
   determining that the first difference data is less than a threshold;
   determining that the second difference data is less than the threshold; and
   based at least in part on determining that the first difference data is less than the threshold and that the second difference data is less than the threshold, causing an acoustic echo canceller to be inactive.

9. A computing system comprising:
   at least one processor; and
   at least one memory including instructions that, when executed by the at least one processor, cause the computing system to:
      receive first audio data corresponding to a first direction relative to a device and corresponding to a first time period;
      receive second audio data corresponding to a second direction relative to the device and corresponding to the first time period;
      receive third audio data corresponding to the first direction and corresponding to a second time period after the first time period;

receive fourth audio data corresponding to the second direction and corresponding to the second time period;

determine first difference data using the first audio data and the third audio data;

determine second difference data using the second audio data and the fourth audio data;

based at least in part on determining that the first difference data is greater than the second difference data, generate output data corresponding to the first audio data and the third audio data; and send the output data to a speech processing system.

10. The computing system of claim 9, wherein the instructions to determine the first difference data, the second difference data, and that the first difference data is greater than the second difference data that, when executed by the at least one processor, further cause the computing system to:

determine a first magnitude and a second magnitude corresponding to the first audio data;

determine a third magnitude and a fourth magnitude corresponding to the third audio data;

determine a fifth magnitude and a sixth magnitude corresponding to the second audio data;

determine a seventh magnitude and an eighth magnitude corresponding to the fourth audio data;

determine a first difference between the first magnitude and the third magnitude;

determine a second difference between the second magnitude and the fourth magnitude;

determine a third difference between the fifth magnitude and the seventh magnitude;

determine a fourth difference between the sixth magnitude and the eighth magnitude; and determine that a sum of the first difference and the third difference is greater than a second sum of the second difference and the fourth difference.

11. The computing system of claim 9, wherein the instructions to determine the first difference data, the second difference data, and that the first difference data is greater than the second difference data that, when executed by the at least one processor, further cause the computing system to:

determine a first average magnitude corresponding to the first audio data;

determine a third average magnitude corresponding to the third audio data;

determine a second average magnitude corresponding to the second audio data;

determine a fourth average magnitude corresponding to the fourth audio data, and determine that a first difference between the first average magnitude and the third average magnitude is greater than a second difference between the second average magnitude and the fourth average magnitude.

12. The computing system of claim 9, wherein the at least one memory further comprises instructions that, when executed by the at least one processor, further cause the computing system to:

determine a first running average based at least in part on the first difference data;

determine a second running average based at least in part on the second difference data; and wherein determining that the first difference data is greater than the second difference data further comprises determining that the first running average is greater than the second running average.

13. The computing system of claim 9, wherein the at least one memory further comprises instructions that, when executed by the at least one processor, further cause the computing system to:

determine a first signal-to-noise ratio corresponding to the first audio data; and determine a second signal-to-noise ratio corresponding to the second audio data, wherein sending the output data is further based at least in part on determining that the first signal-to-noise ratio is greater than the second signal-to-noise ratio.

14. The computing system of claim 9, wherein the at least one memory further comprises instructions that, when executed by the at least one processor, further cause the computing system to:

determine a first signal-to-interference ratio corresponding to the first audio data; and determine a second signal-to-interference ratio corresponding to the second audio data, wherein sending the output data is further based at least in part on determining that the first signal-to-interference ratio is less than the second signal-to-interference ratio.

15. The computing system of claim 9, wherein the at least one memory further comprises instructions that, when executed by the at least one processor, further cause the computing system to:

determine a threshold corresponding to a first amount of variation in magnitude, the first amount of variation associated with variation of audio data representing music; and prior to sending the output data, determine that a second amount of variation in the first difference data is less than a threshold.

16. The computing system of claim 8, wherein the at least one memory further comprises instructions that, when executed by the at least one processor, further cause the computing system to:

determine that the first difference data is less than a threshold;

determine that the second difference data is less than the threshold; and based at least in part on determining that the first difference data is less than the threshold and that the second difference data is less than the threshold, causing an acoustic echo canceller to be inactive.

17. A computer-implemented method comprising:

receiving first audio data and second audio data corresponding to a first direction relative to a device;

receiving third audio data and fourth audio data corresponding to a second direction relative to the device;

determining first difference data using the first audio data and the second audio data;

determining second difference data using the third audio data and the fourth audio data, the second difference data being smaller than the first difference data; and generating output data corresponding to the first audio data and the second audio data.

18. The computer-implemented method of claim 17, wherein the first audio data and second audio data are offset in time.

19. The computer-implemented method of claim 17, wherein the third audio data and fourth audio data are offset in time.

20. The computer-implemented method of claim 17, further comprising:
sending the output data to a speech processing component.

* * * * *